(12) United States Patent
Isaacson et al.

(10) Patent No.: US 9,881,299 B2
(45) Date of Patent: Jan. 30, 2018

(54) SYSTEM AND METHOD FOR PROCESSING FINANCIAL TRANSACTIONS

(71) Applicant: GiftYa LLC, Pittsburgh, PA (US)

(72) Inventors: Thomas M. Isaacson, Huntingtown, MD (US); Ryan C. Durham, Upper Marlboro, MD (US); Jason Wolfe, Sewickley, PA (US); Lewis C. Amicone, III, Ruffs Dale, PA (US); Patrick Ledbetter, Arlington, VA (US); Adam Ludwig, San Francisco, CA (US)

(73) Assignee: GIFTYA LLC, Pittsburgh, PA (US)

( * ) Notice: Subject to any disclaimer, the term of this patent is extended or adjusted under 35 U.S.C. 154(b) by 0 days.

(21) Appl. No.: 14/335,358

(22) Filed: Jul. 18, 2014

(65) Prior Publication Data

US 2014/0330713 A1 Nov. 6, 2014

Related U.S. Application Data

(63) Continuation of application No. 14/219,276, filed on Mar. 19, 2014, which is a continuation-in-part of
(Continued)

(51) Int. Cl.
*G06Q 40/00* (2012.01)
*G06Q 20/34* (2012.01)
(Continued)

(52) U.S. Cl.
CPC ......... *G06Q 20/342* (2013.01); *G06Q 20/10* (2013.01); *G06Q 20/105* (2013.01); *G06Q 20/12* (2013.01); *G06Q 20/24* (2013.01); *G06Q 40/02* (2013.01)

(58) Field of Classification Search
CPC ...................................................... G06Q 30/06
(Continued)

(56) References Cited

U.S. PATENT DOCUMENTS 5,580,196 A 12/1996 Thompson
5,590,196 A * 12/1996 Moreau ................. G06Q 20/00
380/243
(Continued)

FOREIGN PATENT DOCUMENTS

GB 2376787 12/2002
JP 2002/222377 8/2002
(Continued)

OTHER PUBLICATIONS

"Digital Island Corrects and Replaces Previous News Release, BW2059, CA-Digital-Island", Business Wire, Jan. 22, 2001.
(Continued)

*Primary Examiner* — John H Holly

(57) ABSTRACT

Disclosed herein are systems, methods, and non-transitory computer-readable storage media for receiving data from a giver at a first time, the data being used to identify a merchant at which a gift from the giver to a recipient is redeemable. The system presents a group of merchants associated with the data to the giver, each merchant of the group of merchants offering a promotion in connection with the gift. The system receives from the giver a selection of a chosen merchant from the group of merchants, the chosen merchant having an associated promotion. The system then generates a policy comprising the gift, the chosen merchant, and the associated promotion such that upon receiving an indication of a triggering event caused by the recipient, the system can apply the gift and the associated promotion according to the policy.

22 Claims, 14 Drawing Sheets

Related U.S. Application Data application No. 14/193,068, filed on Feb. 28, 2014, now Pat. No. 8,751,392, which is a continuation of application No. 12/075,655, filed on Mar. 13, 2008, now Pat. No. 8,676,704, which is a continuation-in-part of application No. 12/475,122, filed on May 29, 2009, which is a continuation-in-part of application No. 13/301,327, filed on Nov. 12, 2011, now abandoned, which is a continuation-in-part of application No. 12/967,253, filed on Dec. 14, 2010, now Pat. No. 8,285,643, which is a continuation-in-part of application No. 13/754,401, filed on Jan. 30, 2013, now abandoned, which is a continuation-in-part of application No. 13/175,234, filed on Jul. 11, 2011, now abandoned, which is a continuation of application No. 12/967,253, which is a continuation-in-part of application No. 13/771,791, filed on Feb. 20, 2013, now abandoned, which is a continuation of application No. 13/686,189, filed on Nov. 27, 2012, now abandoned, which is a continuation of application No. 13/470,969, filed on May 14, 2012, now abandoned, which is a continuation of application No. 12/967,253.

(60) Provisional application No. 61/057,106, filed on May 29, 2008.

(51) Int. Cl.
*G06Q 20/12* (2012.01)
*G06Q 20/24* (2012.01)
*G06Q 20/10* (2012.01)
*G06Q 40/02* (2012.01)

(58) Field of Classification Search
USPC ...... 705/41, 1.1, 14, 26.8, 35, 36 R; 380/18, 380/25, 54, 30; 709/217, 203, 266
See application file for complete search history.

(56) References Cited

U.S. PATENT DOCUMENTS

| | | |
|---|---|---|
| 5,794,219 A | 8/1998 | Brown |
| 5,848,396 A | 12/1998 | Gerace |
| 5,861,841 A | 1/1999 | Gildea et al. |
| H1794 H | 4/1999 | Claus |
| 5,963,647 A | 10/1999 | Downing et al. |
| 5,984,180 A | 11/1999 | Albrecht |
| 6,000,608 A | 12/1999 | Dorf |
| 6,014,634 A | 1/2000 | Scroggie et al. |
| 6,014,635 A | 1/2000 | Harris et al. |
| 6,044,360 A | 3/2000 | Picciallo |
| 6,068,183 A | 5/2000 | Freeman et al. |
| 6,173,269 B1 | 1/2001 | Solokl et al. |
| 6,175,823 B1 | 1/2001 | Van Dusen |
| 6,182,895 B1 | 2/2001 | Albrecht |
| 6,189,787 B1 | 2/2001 | Dorf |
| 6,292,786 B1 | 9/2001 | Deaton et al. |
| 6,321,211 B1 | 11/2001 | Dodd |
| 6,330,543 B1 | 12/2001 | Kepecs |
| 6,370,514 B1 | 4/2002 | Messner |
| 6,408,307 B1 | 6/2002 | Semple et al. |
| 6,454,165 B1 | 9/2002 | Dawson |
| 6,484,148 B1 | 11/2002 | Boyd |
| 6,487,538 B1 | 11/2002 | Gupta et al. |
| 6,505,046 B1 | 1/2003 | Baker |
| 6,526,335 B1 | 2/2003 | Treyz et al. |
| 6,546,257 B1 | 4/2003 | Stewart |
| 6,571,279 B1 | 5/2003 | Herz et al. |
| 6,587,835 B1 | 7/2003 | Treyz et al. |
| 6,594,644 B1 | 7/2003 | Van Dusen |
| 6,601,037 B1 | 7/2003 | Kolls |
| 6,606,602 B1 | 8/2003 | Kolls |
| 6,609,106 B1 | 8/2003 | Robertson |
| 6,672,507 B1 | 1/2004 | Walker et al. |
| 6,711,474 B1 | 3/2004 | Treyz et al. |
| 6,775,539 B2 | 8/2004 | Deshpande |
| 6,795,710 B1 | 9/2004 | Creemer |
| 6,805,289 B2 | 10/2004 | Noriega et al. |
| 6,865,546 B1 | 3/2005 | Song |
| 6,889,054 B2 | 5/2005 | Himmel et al. |
| 6,947,976 B1 | 9/2005 | Devitt et al. |
| 6,970,871 B1 | 11/2005 | Rayburn |
| 7,010,512 B1 | 3/2006 | Gillin et al. |
| 7,021,531 B2 | 4/2006 | Myttenaere |
| 7,039,601 B2 | 5/2006 | Gary |
| 7,089,208 B1 | 8/2006 | Levchin et al. |
| 7,127,236 B2 | 10/2006 | Khan et al. |
| 7,165,049 B2 | 1/2007 | Slater |
| 7,200,566 B1 | 4/2007 | Moore et al. |
| 7,204,412 B2 | 4/2007 | Foss, Jr. |
| 7,213,027 B1 | 5/2007 | Kominek et |
| 7,280,984 B2 | 10/2007 | Phelan, III et al. |
| 7,357,331 B2 | 4/2008 | Blossom |
| 7,512,552 B2 | 3/2009 | Karas et al. |
| 7,559,465 B2 | 7/2009 | Rosenblatt |
| 7,593,862 B2 * | 9/2009 | Mankoff ........... G06F 17/30011 705/14.1 |
| 7,603,292 B1 | 10/2009 | Bragg et al. |
| 7,698,221 B2 | 4/2010 | Blinn et al. |
| 7,792,751 B2 | 9/2010 | Tan |
| 7,831,439 B1 | 11/2010 | Bryar |
| 7,860,789 B2 | 12/2010 | Hirka et al. |
| 7,861,919 B2 | 1/2011 | Spaeth et al. |
| 7,870,022 B2 | 1/2011 | Bous et al. |
| 7,873,573 B2 | 1/2011 | Realini |
| 8,046,266 B1 | 10/2011 | Geller et al. |
| 8,112,315 B2 | 2/2012 | Dooley et al. |
| 8,452,707 B2 | 5/2013 | Sharma |
| 8,478,638 B2 | 7/2013 | Postrel |
| 8,577,735 B2 | 11/2013 | Wilen et al. |
| 8,639,629 B1 | 1/2014 | Hoffman |
| 2001/0054066 A1 | 12/2001 | Spitzer |
| 2002/0035605 A1 | 3/2002 | McDowell et al. |
| 2002/0040438 A1 | 4/2002 | Fisher, Jr. |
| 2002/0046341 A1 | 4/2002 | Kazaks et al. |
| 2002/0062246 A1 | 5/2002 | Matsubara |
| 2002/0174016 A1 | 11/2002 | Cuervo |
| 2003/0028515 A1 | 2/2003 | Nishikado et al. |
| 2003/0028518 A1 | 2/2003 | Mankoff |
| 2003/0040959 A1 | 2/2003 | Fei et al. |
| 2003/0083941 A1 | 5/2003 | Moran et al. |
| 2003/0130907 A1 | 7/2003 | Karas et al. |
| 2003/0171997 A1 | 9/2003 | Eaton |
| 2003/0182191 A1 | 9/2003 | Oliver et al. |
| 2003/0216960 A1 | 11/2003 | Postrel |
| 2004/0002897 A1 | 1/2004 | Vishik |
| 2004/0073482 A1 | 4/2004 | Wiggins et al. |
| 2004/0078283 A1 | 4/2004 | Gary |
| 2004/0089714 A1 | 5/2004 | Raadsen |
| 2004/0111361 A1 | 6/2004 | Griffiths et al. |
| 2004/0148228 A1 | 7/2004 | Kwei |
| 2004/0162775 A1 | 8/2004 | Winklevoss et al. |
| 2004/0203852 A1 | 10/2004 | Janskiraman |
| 2004/0249712 A1 | 12/2004 | Brown et al. |
| 2004/0254891 A1 | 12/2004 | Blinn |
| 2005/0075932 A1 | 4/2005 | Mankoff |
| 2005/0092828 A1 | 5/2005 | Phillips |
| 2005/0097005 A1 | 5/2005 | Fargo |
| 2005/0108121 A1 | 5/2005 | Gravett et al. |
| 2005/0108159 A1 | 5/2005 | Gravett |
| 2005/0131761 A1 | 6/2005 | Trika et al. |
| 2005/0177493 A1 | 8/2005 | Sung |
| 2005/0197919 A1 | 9/2005 | Robertson |
| 2005/0199712 A1 | 9/2005 | Rosenblatt |
| 2005/0209958 A1 | 9/2005 | Michelsen et al. |
| 2005/0234771 A1 | 10/2005 | Register et al. |
| 2006/0015405 A1 | 1/2006 | Bala et al. |
| 2006/0059070 A1 | 3/2006 | Petruck |
| 2006/0074767 A1 | 4/2006 | Fortney et al. |
| 2006/0095338 A1 | 5/2006 | Seidel |
| 2006/0122856 A1 | 6/2006 | Rushton et al. |

(56) References Cited

U.S. PATENT DOCUMENTS

| | | |
|---|---|---|
| 2006/0178932 A1 | 8/2006 | Lang |
| 2006/0208065 A1 | 9/2006 | Mendelovich et al. |
| 2006/0253320 A1 | 11/2006 | Heywood |
| 2006/0258397 A1 | 11/2006 | Kaplan et al. |
| 2006/0293963 A1 | 12/2006 | Hoblit |
| 2007/0012759 A1 | 1/2007 | Allarea et al. |
| 2007/0017976 A1 | 1/2007 | Peyret et al. |
| 2007/0050711 A1* | 3/2007 | Walker ............ G06F 17/30855 715/205 |
| 2007/0063020 A1 | 3/2007 | Barrafato |
| 2007/0073589 A1 | 3/2007 | Vergeyle et al. |
| 2007/0088610 A1 | 4/2007 | Chen |
| 2007/0088801 A1 | 4/2007 | Levkovitz et al. |
| 2007/0103993 A1 | 5/2007 | Mount et al. |
| 2007/0140176 A1 | 6/2007 | Bachenberg |
| 2007/0143177 A1 | 6/2007 | Graves et al. |
| 2007/0150413 A1 | 6/2007 | Morgenstern |
| 2007/0158413 A1 | 7/2007 | Hastie |
| 2007/0168265 A1 | 7/2007 | Rosenberger |
| 2007/0174120 A1 | 7/2007 | Asmar et al. |
| 2007/0175984 A1 | 8/2007 | Khandaker et al. |
| 2007/0179888 A1 | 8/2007 | Angelovich |
| 2007/0192182 A1 | 8/2007 | Monaco et al. |
| 2007/0210152 A1 | 9/2007 | Read |
| 2007/0255620 A1 | 11/2007 | Tumminaro et al. |
| 2007/0255653 A1 | 11/2007 | Tumminaro et al. |
| 2007/0264991 A1 | 11/2007 | Jones et al. |
| 2007/0270165 A1 | 11/2007 | Poosala |
| 2007/0288313 A1 | 12/2007 | Brodson et al. |
| 2008/0004888 A1 | 1/2008 | Davis et al. |
| 2008/0004984 A1 | 1/2008 | Sendo et al. |
| 2008/0010114 A1 | 1/2008 | Head |
| 2008/0027820 A1 | 1/2008 | Brill |
| 2008/0033817 A1 | 2/2008 | Billmaier et al. |
| 2008/0033857 A1 | 2/2008 | Moses |
| 2008/0048023 A1 | 2/2008 | Russell et al. |
| 2008/0082424 A1 | 4/2008 | Walton |
| 2008/0091528 A1 | 4/2008 | Rampell et al. |
| 2008/0091535 A1 | 4/2008 | Heiser et al. |
| 2008/0097851 A1 | 4/2008 | Bemmel et al. |
| 2008/0133257 A1 | 6/2008 | Adkisson et al. |
| 2008/0189189 A1 | 8/2008 | Morgenstern |
| 2008/0223922 A1 | 9/2008 | Weitzman |
| 2008/0235122 A1 | 9/2008 | Weitzman |
| 2008/0243630 A1 | 10/2008 | Farney |
| 2008/0255948 A1 | 10/2008 | Garner |
| 2008/0288406 A1 | 11/2008 | Sequin et al. |
| 2008/0301005 A1 | 12/2008 | Nieda et al. |
| 2008/0301044 A1 | 12/2008 | Vardi |
| 2009/0018916 A1 | 1/2009 | Seven et al. |
| 2009/0018959 A1 | 1/2009 | Doran et al. |
| 2009/0032581 A1 | 2/2009 | Esslinger et al. |
| 2009/0048926 A1 | 2/2009 | Salesky et al. |
| 2009/0094134 A1 | 4/2009 | Toomer et al. |
| 2009/0112709 A1 | 4/2009 | Barhydt |
| 2009/0125410 A1 | 5/2009 | Perlman |
| 2009/0132387 A1 | 5/2009 | Majdoub |
| 2009/0132415 A1 | 5/2009 | Davis et al. |
| 2009/0138397 A1 | 5/2009 | Sharma |
| 2009/0159698 A1 | 6/2009 | Mullen et al. |
| 2009/0171683 A1 | 7/2009 | Hoyos et al. |
| 2009/0192928 A1 | 7/2009 | Abipaker |
| 2009/0234771 A1 | 9/2009 | Ledbetter et al. |
| 2009/0271265 A1 | 10/2009 | Lay et al. |
| 2009/0287579 A1 | 11/2009 | Walker et al. |
| 2009/0307130 A1 | 12/2009 | Tan |
| 2009/0307143 A1 | 12/2009 | Reistad et al. |
| 2009/0313109 A1 | 12/2009 | Bous et al. |
| 2009/0327067 A1 | 12/2009 | Berger et al. |
| 2009/0327129 A1 | 12/2009 | Collas et al. |
| 2010/0010918 A1 | 1/2010 | Hunt |
| 2010/0017278 A1 | 1/2010 | Wilen et al. |
| 2010/0023341 A1 | 1/2010 | Ledbetter et al. |
| 2010/0023418 A1 | 1/2010 | Bader et al. |
| 2010/0036524 A1 | 2/2010 | Chirco |
| 2010/0057580 A1 | 3/2010 | Raghunathan |
| 2010/0076833 A1 | 3/2010 | Nelsen |
| 2010/0106592 A1 | 4/2010 | Brown |
| 2010/0299208 A1 | 11/2010 | Carlson et al. |
| 2010/0299227 A1 | 11/2010 | Smith |
| 2010/0325006 A1 | 12/2010 | White |
| 2011/0004512 A1 | 1/2011 | Postrel |
| 2011/0011931 A1 | 1/2011 | Farley et al. |
| 2011/0016023 A1 | 1/2011 | Zakas |
| 2011/0106698 A1 | 5/2011 | Isaacson et al. |
| 2011/0282784 A1 | 11/2011 | Nelsen |
| 2011/0295749 A1 | 12/2011 | Scalisi |
| 2012/0029990 A1 | 2/2012 | Fisher |
| 2012/0066041 A1 | 3/2012 | Mankoff |
| 2012/0066212 A1 | 3/2012 | Jennings |
| 2012/0197716 A1 | 8/2012 | Rampell et al. |
| 2012/0197754 A1 | 8/2012 | Kalin |
| 2013/0254068 A1 | 9/2013 | Scipioni et al. |

FOREIGN PATENT DOCUMENTS

| | | |
|---|---|---|
| JP | 2002/334287 | 11/2002 |
| JP | 2004/265294 | 9/2004 |
| KR | 2002/0070232 | 9/2002 |
| KR | 2002/0094340 | 12/2002 |
| KR | 2004/0076556 | 9/2004 |
| KR | 2006/0061515 | 6/2006 |
| KR | 2006/0083825 | 7/2006 |
| KR | 2007/0030467 | 3/2007 |
| KR | 2010/0045666 | 5/2010 |
| WO | WO 02/073489 | 9/2002 |
| WO | WO 03/014982 | 2/2003 |
| WO | WO 2006/065037 | 6/2006 |
| WO | WO 2013/033266 | 3/2013 |

OTHER PUBLICATIONS

"AOL Digital City Kicks Off Major Expansion to Widen Lead in Fast-Growing Local Online Marker", Business Wire, Mar. 21, 2000.

"WindWire Launches WindCaster; Wireless Ad Network Delivers Marketing and Advertising Over the New Wireless Web Medium", Business Wire, Jun. 27, 2000.

Launch of WindWire Undisputed Success; Leader in Wireless Advertising Solutions Serves Over One Million Ads With Click-Through Rates of More Than 15 Percent in First Week of Launch:, Business Wire, Oct. 17, 2000.

"Alcatel Introduces Advanced Version of Its Intelligent Location-Based Server", Canadian Corporate News, Mar. 20, 2001.

"Smart AdServer Targets Quova for Geolocation Needs; Adserving Innovator Switches to Quova for Reliability and Depth of Data", CCNMatthews Newswire, Feb. 5, 2008.

Susan Glairon, "New Marketing Scheme Brings Online Ads to Boulder, Colo., Wireless Customers", Knight Rider/Tribune Business News, Aug. 6, 2000.

Sarah Littman, "On the Berge: The Users are Catching Up with the Technology in the U.S. Mobile Marketing Arena. Are You Ready to Capitalize on a New Marketing Medium that is Almost Ready for its Close-Up? (Mobile Technology)", Response, Feb. 1, 2008.

"Personalized Information to Mobile Users—Add2Phone and Setec to Co-Operate in Mobile E-Commerce", M2 Presswire, Apr. 20, 2000.

Sarah McCammon, "Ladies, It's Your Night for a Bargain (Neighbor)", Daily Herald (Arlington Heights, IL), Feb. 5, 2004.

"The Next Wave in Advertising", New Straits Times, Jul. 2, 2000.

Sanjay Parekh, "Personalization: Turn Browsers Into Buyers: Gathering Customer Intelligence is an art and a Science (Customer Relationship Management)", e-Business Advisor, Sep. 1, 2002.

"[x + 1] Personalizes Web Optimization with New, Patented Technology", PR Newswire, Sep. 18, 2007.

"Power of Real Time (Brief Article)", Crain's New York Business, Oct. 30, 2000.

Michelle Speir, "BlackBerry pushes a Sweet Solution", Nov. 6, 2000, Federal Computer Week, pp. 40-42.

"Consumers Can Show Their Support for Small Business This Holiday Seasons on "Small Business Saturday(SM)"", Retrieved

(56) References Cited

OTHER PUBLICATIONS from http://about.americanexpress.com/news/pr/2010/sbs.aspx Nov. 28, 2011.
Lee S. Adams et al., "Developments in Cyberbanking", The Business Lawyer 56.3 (May 2001).
"Developments in cyberbanking," By: Adams, Lee S.; Martz, David J.; Poindexter, Obrea O.—The Business Lawyer 56.3 (May 2001).

* cited by examiner

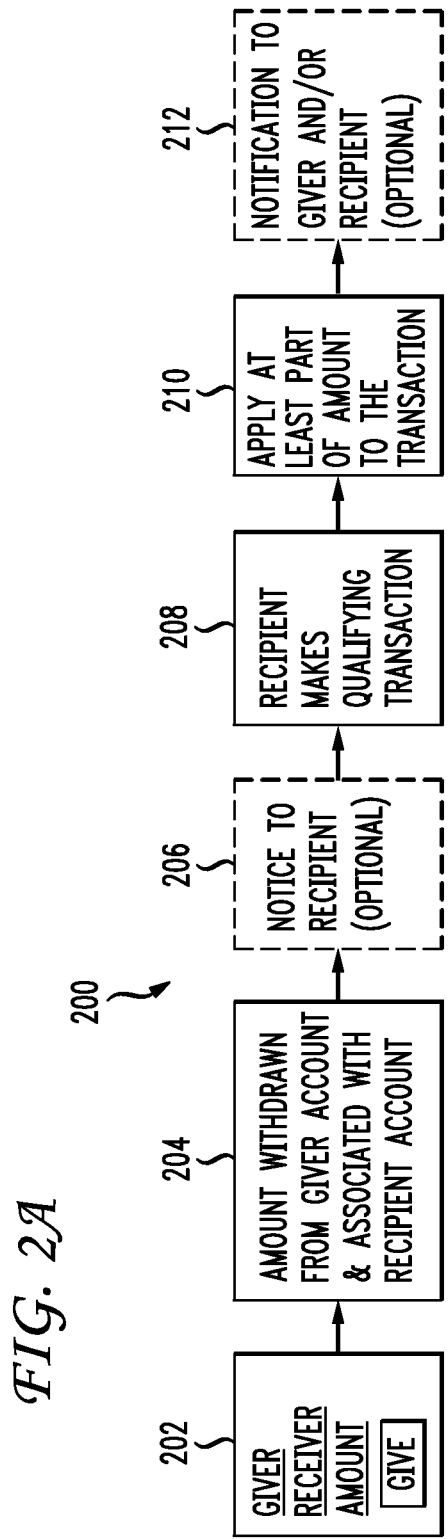

FIG. 4C

| SECURITY | HEADER | GIVER | RECIPIENT | AMOUNT | PAYMENT MODE | TIME | LOCATION | OTHER OPTIONS |
|---|---|---|---|---|---|---|---|---|
| 472 | 474 | 476 | 478 | 480 | 482 | 484 | 486 | 488 |

Figures 5A, 5B:
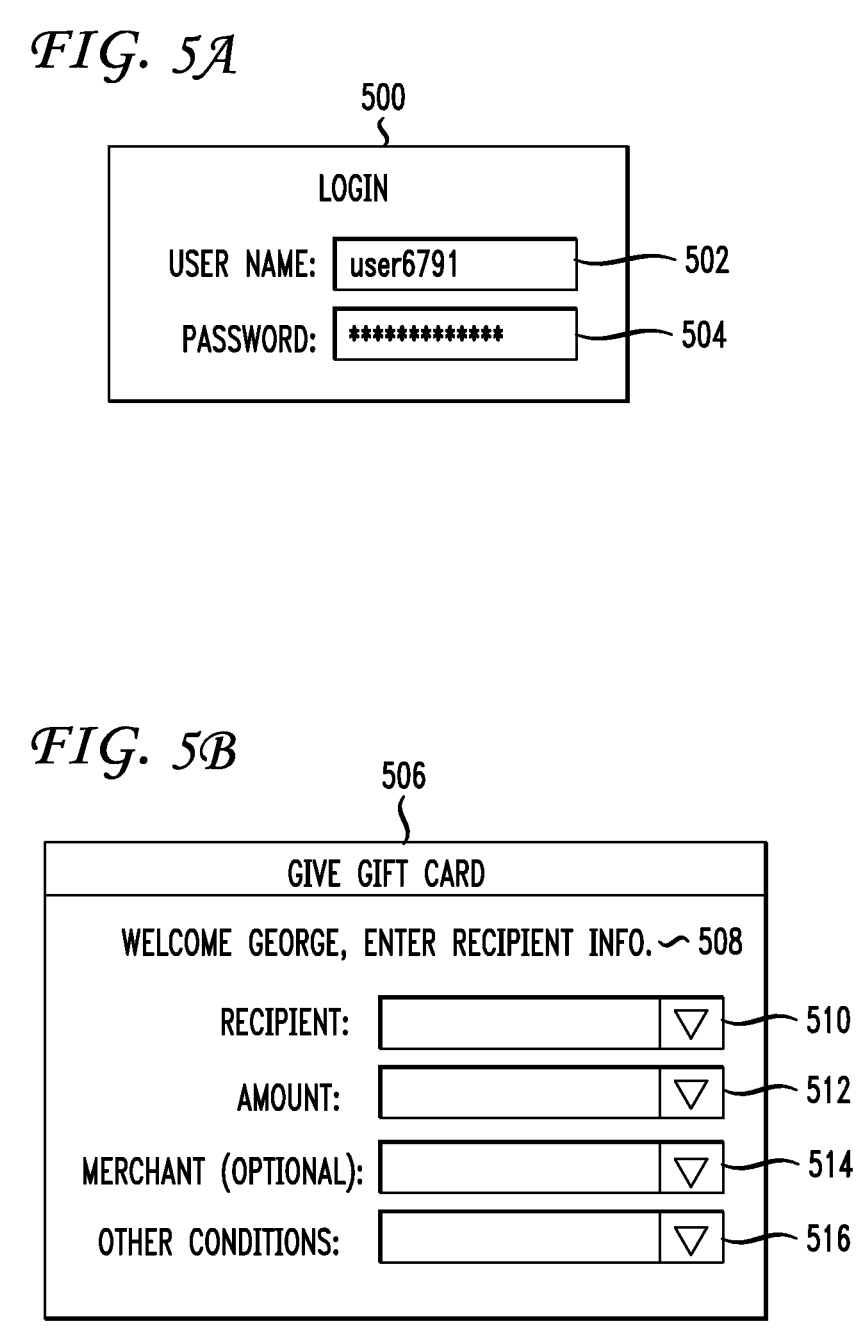

LOGIN

USER NAME: user6791 — 502
PASSWORD: ************ — 504

GIVE GIFT CARD

WELCOME GEORGE, ENTER RECIPIENT INFO. — 508

RECIPIENT: ▽ — 510
AMOUNT: ▽ — 512
MERCHANT (OPTIONAL): ▽ — 514
OTHER CONDITIONS: ▽ — 516

From: Gift Card Services
520 — To: rachel@email.com
522 — cc: george@email.com
Subject: Gift Card from George for Home Depot Rachel,
524 — George has sent you a gift card for Home Depot for $75 You can use the gift card by simply using your Visa card at any Home Depot or at Home Depot.com Best Regards,
Gift Card Services

From: Gift Card Services
To: rachel@email.com
cc: george@email.com
Subject: Gift Card Funds Applied Rachel,
528 — We have applied gift card funds of $29.64 to Your recent transaction for a shovel at Home Depot. $45.36 remains available for use at Home Depot. Just use your Visa and the remaining funds will be applied to that purchase. Click Here to manage your gift card.

Best Regards,
Gift Card Services

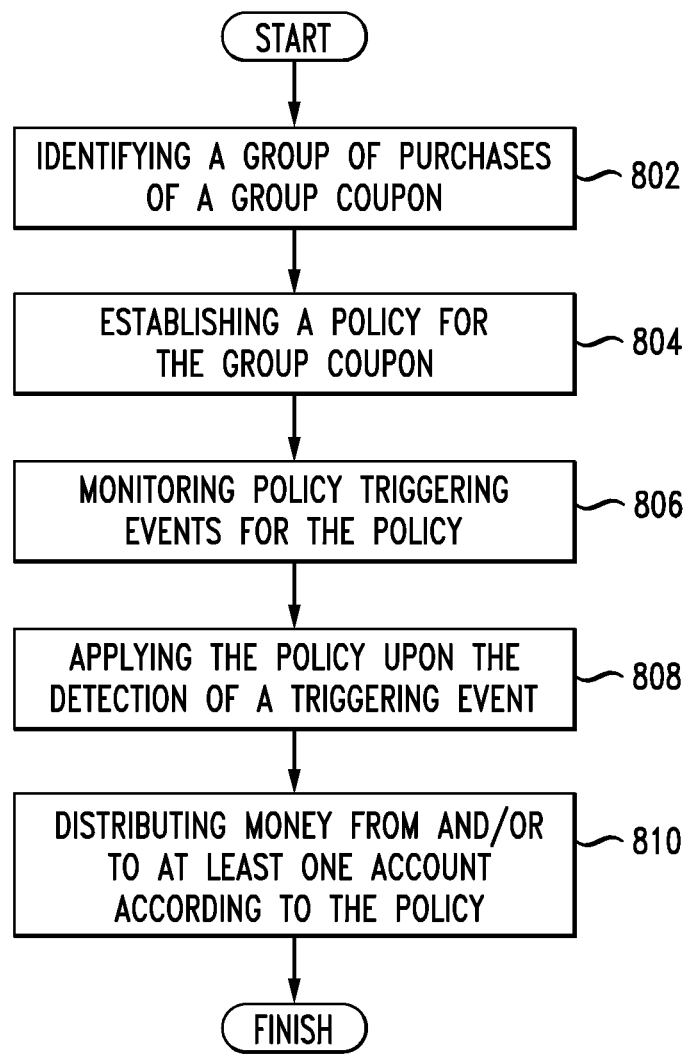

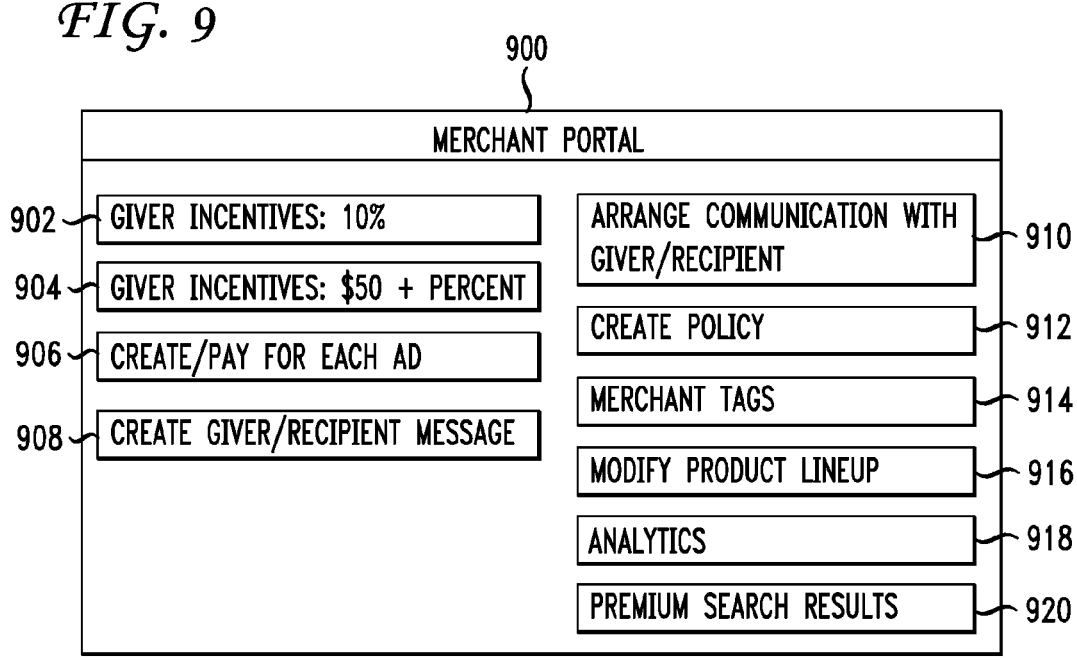
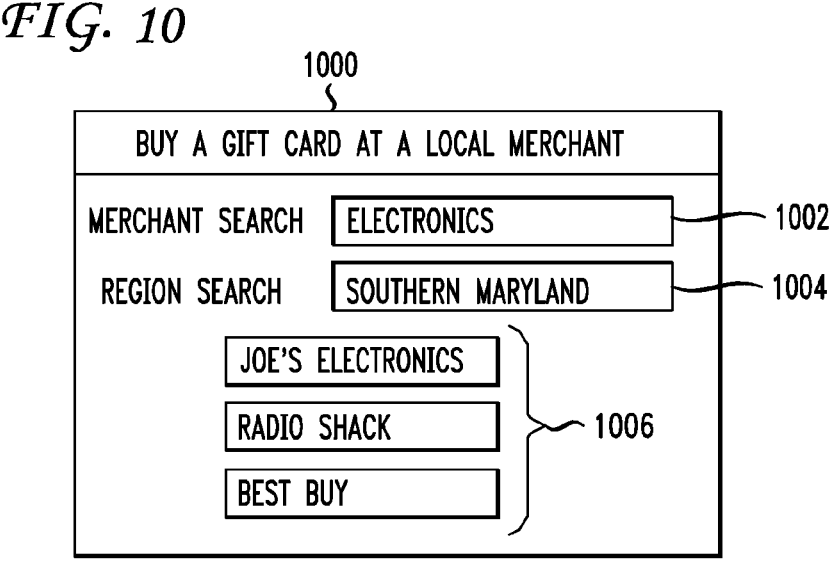

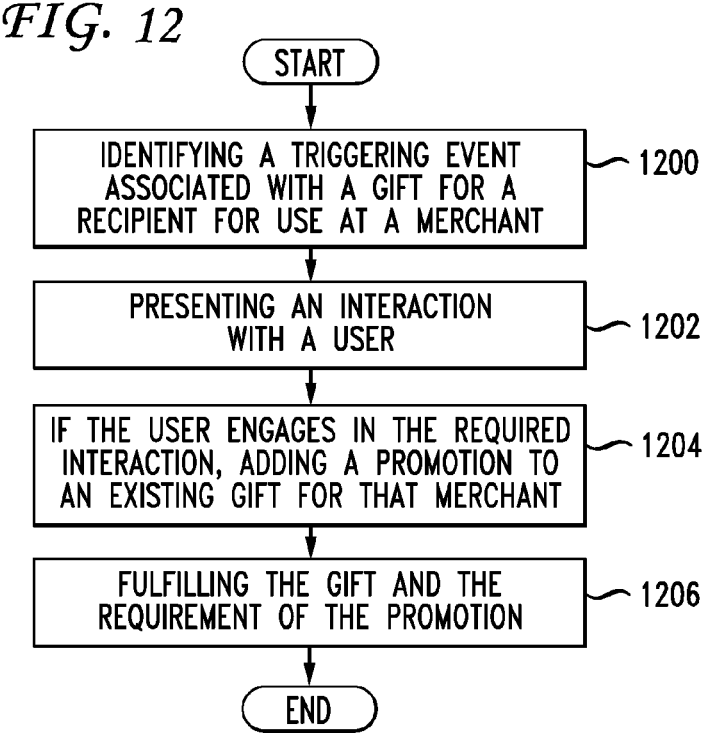
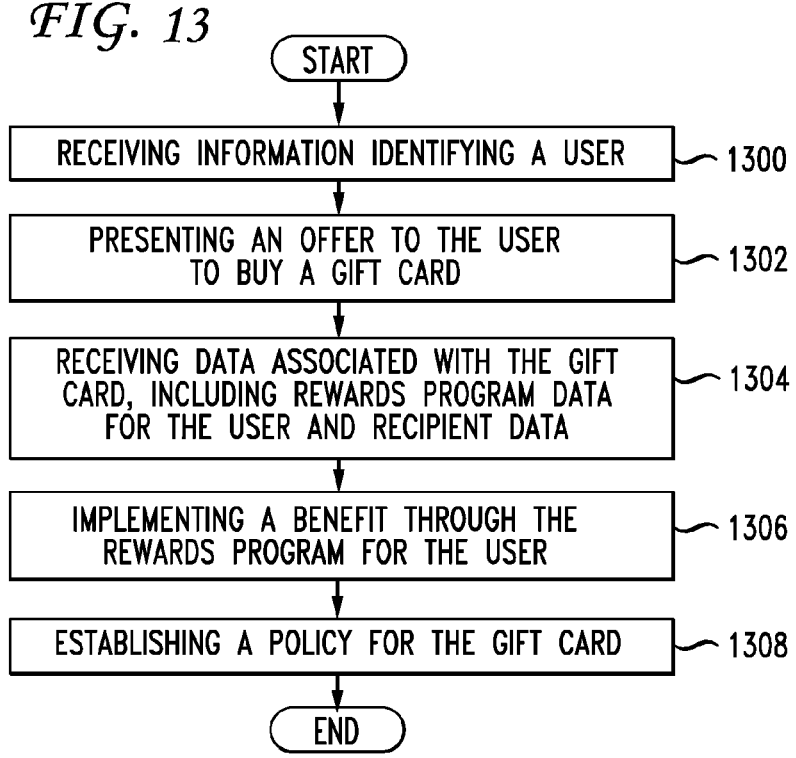

SYSTEM AND METHOD FOR PROCESSING FINANCIAL TRANSACTIONS

PRIORITY

The present application is a continuation of U.S. patent application Ser. No. 14/219,276, filed Mar. 19, 2014, which is a continuation-in-part application claiming priority to U.S. Non-provisional application Ser. No. 14/193,068, filed 28 Feb. 2014, which is a continuation of U.S. Non-provisional application Ser. No. 12/075,655, filed 13 Mar. 2008, now U.S. Pat. No. 8,676,704, issued 18 Mar. 2014, and to U.S. Non-provisional application Ser. No. 12/475,122, filed 29 May 2009, which claims priority to U.S. Provisional Application 61/057,106, filed May 29, 2008, and to U.S. Non-provisional application Ser. No. 13/301,327, filed 21 Nov. 2011, which is a continuation-in-part of U.S. Non-provisional application Ser. No. 12/967,253, filed 14 Dec. 2010, now U.S. Pat. No. 8,285,643, issued 9 Oct. 2012, and to U.S. Non-provisional application Ser. No. 13/754,401, filed 30 Jan. 2013, which is a continuation-in-part of U.S. Non-provisional application Ser. No. 13/175,234, filed 1 Jul. 2011, which is a continuation of U.S. Non-provisional application Ser. No. 12/967,253, filed 14 Dec. 2010, now U.S. Pat. No. 8,285,643, issued 9 Oct. 2012, and to U.S. Non-provisional application Ser. No. 13/771,791, filed 20 Feb. 2013, which is a continuation-in-part of U.S. Non-provisional application Ser. No. 13/686,189, filed 27 Nov. 2012, which is a continuation of U.S. Non-provisional application Ser. No. 13/470,969, filed 14 May 2012, which is a continuation of U.S. Non-provisional application Ser. No. 12/967,253, filed 14 Dec. 2010, now U.S. Pat. No. 8,245,643, issued 9 Oct. 2012, the contents of each of which are herein incorporated by reference in their entireties.

BACKGROUND

1. Technical Field

The present disclosure relates to coupons and promotions and more specifically to policy-based electronic monitoring of purchases to apply coupons without a physical coupon, gift certificate, or coupon card used at a point of sale. Another aspect of this disclosure provides a merchant portal to manage coupons, promotions, gift cards or other offers associated with that merchant. Yet another aspect relates to enhancing a gift for a recipient if the recipient engages in an interaction with a device to yield a gift having a portion from a giver and a portion from the merchant.

2. Introduction

A problem exists where consumers have an opportunity to buy a coupon or book of coupons and then have to carry the coupon or book to the store for redemption. This is an approach often used locally for fundraisers. For example, schools may sell to parents for $20 a coupon book that includes 40 different coupons, gift certificates, or other promotional offers for neighborhood stores. Such coupons might be for $10 off on a $50 purchase or more at the local Sears or a 15% discount at Bob's Audio/Video Emporium. Often the stores having coupons in such coupon books are local mom and pop stores. Users pay for the coupon book and then go from store to store and tear out the coupon for that particular store when they shop. Then the store employee has to process the coupon by providing the discount at the point of sale. This process involves printing the coupons, processing the sale, and processing the coupons themselves. Further, users who purchase these coupon books may forget to bring them along when shopping at the merchants, or may forget which coupons have been used, or may even forget about the coupon book altogether. Thus, even when a user has purchased the coupon book, and frequently shops at merchants promoted in the coupon book, many barriers hinder the redemption or application of these coupons.

Current approaches do not solve the fundamental problem of the recipient or other person desiring to apply a coupon forgetting to use the coupon, forgetting which coupons are available, or losing the coupon book.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

To address the issues in the art, the present disclosure offers a "cloud based" approach to coupons and coupon books. A database in a network can store a record of a coupon book as well as one or more individuals that have purchased the coupon book. For example, a system can store data that Jane Doe has purchased the coupon book that contains 20 coupons, each for a local store in Jane Doe's city. The data that is stored will also include Jane Doe's purchasing account. Therefore, an electronic version of the coupon book can be implemented by the system implementing a policy that tracks Jane Doe's purchasing transactions using a payment account. The policy can also be to monitor a location of a user device to determine when to apply a transfer of money. Thus, the transaction can be a user confirming that they are at a particular location. When system encounters a satisfying transaction according to the policy, the policy automatically applies the appropriate coupon, promotion, or discount. A system practicing this approach first receives an identification of a coupon or group of coupons, and receives a purchase of the coupon or group of coupons and associates a purchaser's payment account. Then the system establishes a policy that causes the system to monitor the purchaser's purchases at the various merchants having coupons covered by the policy, and, as purchases are made using the payment account at coupon offering merchants, the system applies the coupon to the purchases. In this way, the user does not have to present any physical coupon, certificate, or card, nor does the user have to present a code or password at the point of sale. The user simply makes the qualifying purchase using his or her existing payment account in the usual manner, and the policy, which monitors transactions using the payment account, handles applying the promotion or coupon.

Also disclosed herein is a policy-based approach for handling a Groupon.com business model. In this aspect, the system associates, for each person who has purchased an activated groupon, respective payment accounts with the activated groupon in association with a policy. Then, as each purchaser goes shopping and makes the purchase at a participating merchant, the system detects each purchase and applying the appropriate discount according to the policy.

In another aspect, the system receives data identifying a group of purchasers of a group coupon, and establishes a policy for the group coupon such that each purchaser can redeem the coupon by using a credit card, debit card or other payment account that can be electronically monitored. In one aspect, a mobile device is used as a credit card to affect a purchasing transaction. For example, a store can have a system that wirelessly communicates with a handheld device such that the user can utilize the handheld device and payment account information that can be communicated therefrom to finalize a payment transaction using a payment account. Therefore, whether a physical credit or debit card is used, a personal identification number or other identifying mechanism is used, or a wired or mobile device, each of these payment modes can apply to the process as disclosed herein. Then the system monitors or receives information from an entity that monitors, for each individual purchaser, his or her purchases using the respective payment account. Thus, when each user makes a purchase at a merchant associated with the group coupon, the system can apply the policy for that user and charge the user's purchase account for the purchase and distributing money to the various necessary accounts according to the policy.

Also disclosed are various systems and non-transitory computer readable media performing the methods and functions set forth herein. Transitory computer readable media and signals per se also represent other embodiments disclosed.

Also disclosed herein are various merchant interfaces which enable individual merchants to input data that can promote or affect how gift cards or coupons are processed at their store. For example, at a mom and pop pizza parlor, with only one location, the system can provide a merchant interface such that the owner of the pizza parlor can offer givers gift cards or coupons, an extra promotion which can be redeemed using the giver's payment account. Other variations can also be offered via the merchant portal. For example, the merchant may offer a free dessert to any recipient of a gift card of $50 or more. The merchant may offer any recipient of a gift card of $50 or more an extra $3 off their purchase.

In another aspect, a method includes a system receiving data from a giver at a first time, the data being used to identify a merchant at which a gift from the giver to a recipient is redeemable. The system presents a group of merchants associated with the data to the giver, each merchant of the group of merchants offering a promotion in connection with the gift. The system receives from the giver a selection of a chosen merchant from the group of merchants, the chosen merchant having an associated promotion. The system then generates a policy comprising the gift, the chosen merchant, and the associated promotion such that upon receiving an indication of a triggering event caused by the recipient, the system can apply the gift and the associated promotion according to the policy. Preferably, the gift has an associated amount of money that is drawn from a giver payment account that is independent of the recipient payment account, and the giver payment account and the recipient payment account both existed prior to the first time. Thus, two users, each already having accounts such as a visa credit or debit account, google wallet account or paypal account, can participate in giving and receiving a gift in this manner.

In yet another aspect, a method includes a system receiving an identification of a giver of a gift card and a recipient of the gift at a first time, wherein the giver is associated with a giver payment account existing prior to the first time, and the recipient is associated with a recipient payment account existing prior to the first time, and wherein the giver payment account and the recipient payment account are independent of each other. The system associates a policy having a triggering event with the gift. The system determines, via a processor, whether the triggering event occurs according to the policy. Typically, the triggering event is associated with the recipient at a second time, which is later than the first time, and can be an event such as a location of the recipient as identified by a mobile device. If the triggering event occurs, the system applies at least part of the gift by transmitting money to the recipient payment account. The triggering event can be a confirmation that a recipient device is at a location of a merchant according to the policy or that the mobile device has been to at least one of a set of locations according to the policy.

If the triggering event occurs, the system can also present an interaction with the recipient through a device. If the recipient interacts with the device to address the interaction, the system can then add a promotion to the gift. For example, when a recipient of a gift enters a store, the store or the system can prompt the user to answer a few questions on their device or another device. The system could ask the user to play a game. If the user engages in any type of interaction, the gift can be modified or enhanced such that the total gift includes a portion from the give and a portion from the merchant. This can enhance customer relations and give the merchant valuable customer data.

Another embodiment associated the purchase of a gift card with a merchant rewards program. A method according to this embodiment includes receiving data from a giver regarding a giver payment account and a giver rewards program account, receiving from the giver an identification, at a first time, of an electronic gift card having a gift card amount, a gift card merchant and a gift card recipient having a recipient payment account that is independent of the giver payment account, wherein the giver payment account and the recipient payment account existed prior to the first time. A system practicing the method establishes a policy associated with monitoring a triggering event associated with the gift card recipient redeeming at least a portion of the gift card amount at the gift card merchant and provides a benefit to the giver via the giver rewards program based on a purchase of the electronic gift card by the giver. Thus, a giver can buy an electronic gift card at a grocery store interactive device and automatically have their rewards account receive points for the purchase to receive a discount on gas. Optionally, the rewards can be provided via the identification of the giver through their giver payment account rather than a separate rewards program.

Finally, the present disclose presents an opportunity for merchants to enhance and/or promote the use of gift cards at their store using a portal specific to that merchant. The merchant can establish that the policy is that when a recipient of a gift card is at the merchant location, the policy applies and a transfer of money occurs from an account to the recipient account. Plus, if the recipient then actually makes the purchase using the recipient account, an additional gift is added.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A illustrates an example flow for processing a virtual gift card;

FIG. 4C illustrates an exemplary packet structure for communicating virtual gift card transactions with a server;

FIGS. 5A, 5B, 5C, and 5D illustrate an exemplary social media architecture for processing gift transactions;

FIG. 8 illustrates a fourth example method embodiment also related to a Groupon-like model;

FIG. 9 illustrates an example user interface for a merchant portal;

FIG. 10 illustrates a user purchasing portal;

FIG. 12 illustrates yet another method embodiment; and

FIG. 13 illustrates another method embodiment related to rewards programs.

DETAILED DESCRIPTION

Figure 1:
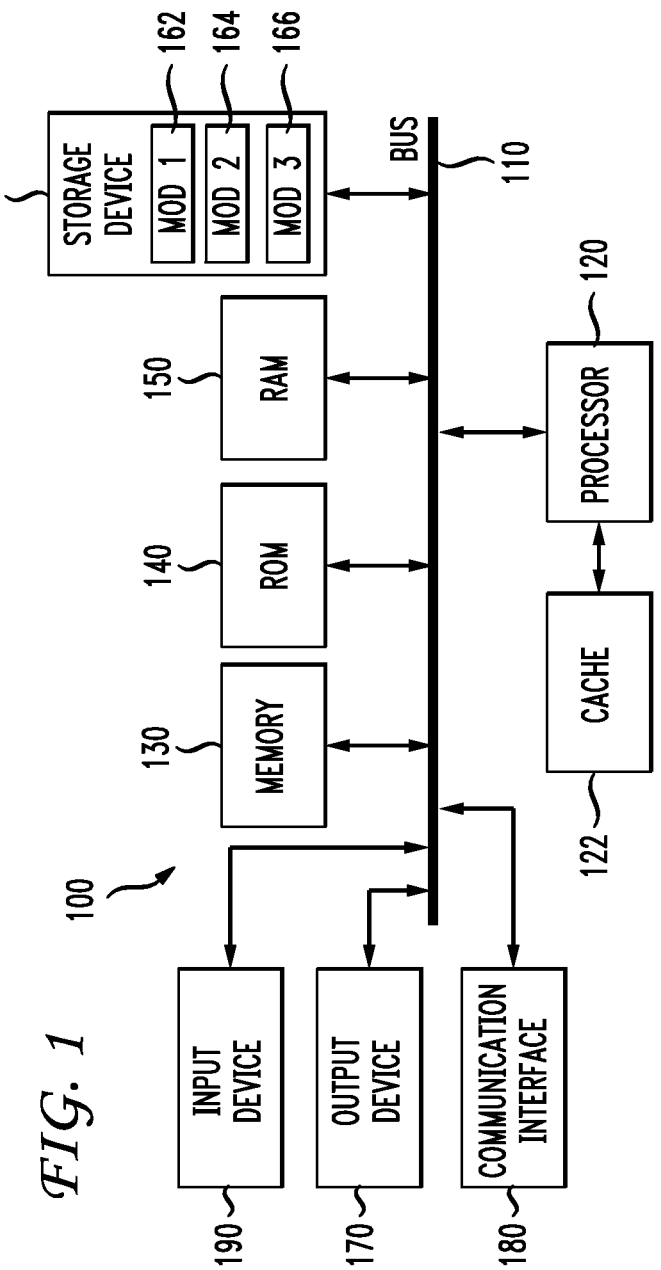
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Any particular function disclosed in connection with one embodiment or aspect can expressly be integrated into another disclosed embodiment, function or aspect. This disclosure considers mixing and matching of the various functions although particular functions are not specifically discussed in one example.

The present disclosure addresses the need in the art for removing hurdles in giving, redeeming, and processing gift cards and particular to gift cards that are given and redeemed without a physical gift card or gift code. A brief introductory description of a basic general-purpose system or computing device in FIG. 1 that can be employed to practice the concepts is disclosed herein. A more detailed description will then follow of the various credit/debit processing infrastructure, the exemplary methods, and other financial processing infrastructure and concepts in conjunction with virtual gift cards that are redeemed using an existing payment mechanism transparently, that is, without any additional physical gift card, gift certificate or any gift code. A recipient of a virtual gift card can simply purchase a qualifying good or service with her Visa card, for example, and the payment processing infrastructure associated with the Visa card applies the virtual gift card amount automatically to the transaction. This disclosure involves more than just a direct transfer of money from one person to another, or from a gift card to a credit card account, but rather focuses on a gift card approach in which a gift card is established at a first time having a policy, and a recipient, at a second time that is later than the first time, executes a purchasing transaction according to the policy. When that transaction is detected, the system will implement the policy and apply the gift card funds at a third time which is later than the first time, and can be approximately around the second time or later than the second time. The implementation and use of such a policy to guide/manage gift card payment through a recipient's use of an existing account introduces many novel features that are disclosed herein.

The policy can include at least one of: a class of goods or services, an amount of money, a merchant or group of merchants, a ceiling amount of money to be used in the gift card, a time frame for use of the gift card, a location of a recipient mobile device, one or more recipient payment accounts that when used can trigger the transfer of money from the giver payment account to the one or more recipient payment accounts, and a predetermined period of time in which if all the amount of money associated with the gift card is not used according to the policy, a remainder amount of money is transferred from the giver payment account to the recipient payment account. The giver payment account and the recipient payment account are separate and independent from each other, such as a giver's American Express credit card and a recipient's Visa debit card. In one example, the policy can monitor where a recipient mobile device is. If the device is at a particular merchant location, and/or the user confirms the location, then a transfer of money occurs to the recipient account. In that case, the user does not even have to make a purchase. They get the money transferred as triggered by the location information. Further aspects of the policy could include an additional amount of money to benefit by actually making a purchase at the merchant. The giver payment account and the recipient payment account can exist prior to the gift, any transfer of money, and/or initial phases of the gift creation process, and can be associated with a user profile on a gift platform.

A new result of this approach is to render a recipient open-loop credit/debit card account into a hybrid open-loop/closed-loop account. The system monitors the activity of the account such, that for average purchase, the account is open-loop and not restricted, but the application of the gift card to specific purchases according the policy is considered closed loop. The system can also monitor other data such as device location or other outside events such as sports scores, weather, etc.

For the sake of clarity, the methods herein are discussed in terms of an exemplary system 100 as shown in FIG. 1 configured to practice the method. The steps of each method outlined herein are exemplary and can be implemented in any combination and/or permutation thereof, including combinations that exclude, add, or modify certain steps. These and other variations are discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high-speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs hard disk 160, those skilled in the art should appreciate that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general-purpose DSP circuit, may also be provided.

The logical operations of the various embodiments are implemented as: (1) a sequence of computer-implemented steps, operations, or procedures running on a programmable circuit within a general use computer, (2) a sequence of computer-implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The term "system" or similar terms also apply to the herein disclosed systems for processing various types of transactions. There are differences in systems for processing credit card and debit card transactions. It is assumed that with the policies and processing disclosed herein, that appropriate adaptations are made for specific systems where necessary. Those of skill in the art will understand the hardware components used for accomplishing such transactions.

The physical systems performing the functions disclosed herein can be found in any geographic location. For example, one or more of the banks, servers, and physical infrastructure performing the steps herein may be outside the United States. Therefore, all processes should be interpreted as also including the concept of a recipient performing a purchase in the United States, communications leaving the United States (confirmation, authorization, instructions, etc.) for a foreign entity, and communications being received from the foreign entity that achieves the results discussed herein.

Virtual Gift Cards

Having disclosed some components of a computing system, the disclosure now turns to FIG. 2, which illustrates an example flow 200 of the basic approach disclosed herein for processing a virtual gift card. The embodiments disclosed herein are discussed in terms of an exemplary system 100 or computing device as shown in FIG. 1 configured to practice the various embodiments. A more specific exemplary system for implementing this flow 200 is illustrated in more detail in FIG. 4 with respect to a control engine that manages the redemption and processing of each gift card according to its policy via communications and instructions with various accounts and/or merchants accounts. Feature 202 represents a giver interface. An example will be used to step through the various blocks. Assume that a giver desires to give a $50 virtual gift card to a recipient. The interface 202 enables the giver to either input identification information and recipient payment account information or have it prepopulated based on a previous login. The interface 202 can be a web interface, a software client interface, a point of sale interface that a store employee uses on behalf of a giver, a self-service kiosk, a voice-based interface, an interface via a handheld device, a multi-modal interface, speech interface, or any other suitable interface. The system 100 identifies, via the giver selection, a predictive approach, or some other approach, a recipient such as a mother, sister, or friend of the giver, etc., and an amount that the giver desires to give to the recipient. The recipient credit/debit card data/account is identified via a secure communication to a database or inserted by the giver or recipient if necessary or possible. Through one or more different methods, the giver payment account and recipient payment account are identified.

The timing of the creation and redemption of the gift card is relevant. In one example, the creation of the gift card by the giver occurs at a first time, say Monday morning at 9:00 AM. The policy is established at that time or perhaps relatively close to that time, such as the gift card is good for purchases at restaurants. The recipient will then at a second time, which is later than the first time, execute a purchasing transaction at a restaurant, for example on Friday night at 6:00 PM. The policy can then be implemented (money transferred, paid, etc.) at the time of the transaction around Friday at 6:00 PM, or the system may scan the recipient transaction history say every Saturday to determine whether qualifying transactions exist. Assuming that the system can identify restaurant transactions on the recipient transaction history, it would then detect the Friday night restaurant purchase and implement the policy for that purchase. A qualifying transaction can also be location-based. When a user enters a store or is at a particular location according to the policy, the system can implement the policy. Thus, a benefit could occur by virtue of the user just entering a store. The user may need to confirm their location with an interaction with a device but that is optional.

The recipient bank might desire such scanning of the recipient purchasing history to remain anonymous. In this case, a secure communication between a central control entity and the recipient payment account holder can simply provide higher level policy data. For example, a participating recipient bank can have a module in place to perform such scanning and receive data from a central control entity to monitor Rachel's account for purchases at the Olive Garden and notify us of such a purchase. Rachel's bank or credit card issuing entity can then monitor her account and simply provide the basic data of such a transaction at the level needed. For example, the control entity can instruct the bank that the gift card is for $40 at Olive Garden and to monitor for 6 months and report back (1) whether a purchase was made at Olive Garden, and if it was under $40, then the amount, or if it was over $40. Assume one month later Rachel makes a $42 purchase at Olive Garden. Her bank can notify the control entity that a purchase was made for over $40 dollars (thus maintaining the secrecy of the total amount). The control entity can then apply the policy for the entire gift card. If Rachel spent $35, her bank can report the purchase and the amount as $35. The policy then causes $35 of the gift card to be applied to the transaction and maintains the record that $5 is still available. If after 6 months no other purchase is made by Rachel, the control entity can simply transfer the rest of the funds to Rachel's account or take some other action based on the policy. Because Rachel's bank was instructed to monitor her accounts for gift card related activity for six months, once the six month expires, that monitoring simply expires as well. This approach can simplify and separate the implementation of the policy from a control entity and a giver or recipient bank.

Preferably, the interface has access to the giver and recipient payment accounts such that the giver does not have to enter credit/debit card or checking account information. Either way, the interaction can confirm to the giver that a sufficient level of information exists to carry out the gift card transaction. This can include that an authorization communication has confirmed that the recipient has a valid credit/debit card or other valid payment account. The specific recipient card to be used to redeem the gift card can be provided, optionally without the card number, to the giver. The interface can optionally tell the giver that the recipient Visa credit card is to be used for the gift card or can enable the giver to select which payment mode the recipient should use. I.e., the system may instruct the giver that the recipient's Visa Credit card and MasterCard Debit card are both available, and to choose which one is to be used. The giver can click a "give" button that begins the transaction. Upon triggering the transaction, information is transmitted to block 204 that will withdraw, hold the amount ($50), or reserve in a line of credit from a giver payment account and associate it with the recipient credit/debit card account and the policy for managing the gift card. The policy can involve monitoring purchasing transactions or other data such as device location independent of a purchasing transaction. The particular process of retrieving the gift card amount from the giver payment account will depend on the type of account is used or other policy considerations. Applying the gift card amount, depending on the types of accounts involved, may include processes as reserving an amount of available credit, reserving an amount of money in an account, transferring money from one account to a holding account, transferring money to a merchant account directly, handling a transaction immediately such as is done with a debit card, handling a transfer of money in a batch mode a period of time after a qualifying transaction, and so forth. Any combination of these and other transactional components can be applied to carry out the policy for any specific gift card.

If the recipient does not have an account, the system can either send a notification to a recipient indicating that someone wants to give them a virtual gift card and encouraging the recipient to set up an account. If the recipient does not have an account because the recipient is a child, for example, who is not old enough to have a credit/debit card, the system can suggest to the giver a suitable proxy recipient who has an account, such as a parent or guardian. If the recipient is unable or unwilling to set up an account and no suitable proxy recipient is available or known, the system can take some default action. The default action can include mailing a check or a traditional physical gift card to the recipient.

The information received from block 202 is sufficient to identify a giver payment account from which to draw or hold the $50 for giving to the recipient. Also, the information received from block 202 can identify a recipient payment account such as a bank account, credit/debit account, specialty credit card such as a Macy's credit card or an Old Navy credit card, online payment account, or other suitable device or mechanism associated with purchases and/or payments so that the recipient can receive the money. As noted above, the terms "credit card" and "debit card" encompass credit cards and debit cards as well as PayPal, cash, club cards, checks, merchant-specific credit cards, smartphone payment mechanism, and other payment modes as well. Accordingly, in block 204 the system identifies and associates the various accounts with this virtual gift card in preparation for completing the transaction. Optional block 206 involves sending a notice to the recipient. Because no physical gift card is given, if the giver wants to give a virtual gift card of $50 to the recipient for use at a restaurant, such as Olive Garden, the system can provide an email or other notification via text or voicemail or other mechanism. One example notification simply states "George has given you a $50 virtual gift card to Olive Garden, please use your Visa and $50 will be applied to your purchase at Olive Garden." No interaction is necessary with any notification. Indeed, no notification is required for the transaction to work. The recipient may only know about the gift card after it is redeemed, or when the giver or the system tells them. The merchant can inform the recipient when the virtual gift card is redeemed as well. The redemption of the gift card is independent of any communication to the recipient or of any notification mechanism although accessory features, upselling, or optional variations to the policy of the gift card can be applied through such notifications and interactions between the giver and/or seller that can occur via such communication.

A policy associated with the gift card can be as simple as applying the gift card amount to the transaction by the recipient at any merchant. Other policies and variations are further disclosed. The policy may involve identifying a location of a user or a mobile device to trigger a payment. Several other aspects are associated with the optional notification 206 to the recipient. As has been noted, the notification is optional inasmuch as the information associated with the giver and the recipient is already obtained and can be processed without any automatic or other notification at all. The giver can simply call up the recipient and tell the recipient that the recipient got a $50 virtual gift card for use at Olive Garden and all the recipient needs to do is use their credit card or any of the designated payment modes or accounts. The user may only need to physically go to the Olive Garden to initiate the transfer. Once the money is transferred, the user can leave. As noted above, the giver interface can notify the giver that the card is redeemable through the recipient's credit card. The policy can cover several accounts and a multitude of scenarios. The gift card is redeemable through using the recipient's credit/debit card at the merchant as though they were making a normal payment without the existence of the gift card or via another data transfer such as the user being in a certain location as identified by GPS or other location identification system. The policy is implemented through control mechanisms on a server, distributed at various banks, or associated with the various banks involved to monitor the recipient purchasing activity to identify a triggering event or transaction to implement the policy of the gift card. For example, the recipient credit card account can have a monitoring module associated with it when a gift card is redeemable with that account. The monitoring module can identify when a purchase is made and notify a central control entity, which can cause the system to apply the gift card funds according to the policy.

In another aspect, however, given the framework disclosed herein, email or other electronic notification to the recipient can provide other features. The email can be a simple notification such that the recipient does not have to interact with the email at all in order to use the virtual gift card. The notification can have no mechanism (or no mandatory mechanism) for feedback, reply, or confirmation. In other aspects, communication or interaction with the recipient can be desirable for security or other purposes. For example, the email can provide some information such as "George has given you a $50 virtual gift card to Olive Garden. Do you know George and do you want to accept this gift card?" The system can require the recipient to click a confirmation button link or perform some other interaction to confirm that the recipient desires to use the gift card. Interactions with the notification can modify or confirm the policy. The recipient may receive a communication that says, "George has given you a virtual gift card for $50, do you want to redeem it through your Visa credit card (and add $5) or through your debit card (and add $3)." Based on the selection of the recipient, the policy is established and accessory features are added, if any. These interactions are optional and, even when present, the interactions, communications, and notifications with the recipient are not required for redemption of the virtual gift card.

As a value-added service, the system can, as part of the interaction, allow the recipient to reserve a table at Olive Garden, invite others to join the dinner at Olive Garden, show a custom menu including updated prices for items based on the gift card amount (which would be free for items under $50), a meal planner application to see an estimated total cost (after the $50 virtual gift card) of a specific set of items (such as an appetizer, two entrees, drinks, dessert, etc), and the like. The interactions can include verification questions to further confirm that the recipient is the appropriate person and that they know the giver, and so forth. Those of skill in the art can understand various mechanisms for confirming and authorizing the transfer of funds from the giver to the recipient.

The user can make the purchase using a mobile device that communicates via a short distance electronic signals such as near field communication. An NFC system at a restaurant table, for example, can enable a user to enter and simply tap the table with their smart phone to pay for the meal. The values of a gift card can be stored in someone's mobile device as well or on the network. Thus, even independent of a WiFi or other network connection with an NFC device, the system can process a payment by virtue of a storage of an amount of money in an account that can be used to process the payment. The ultimate goal is simplicity for the user. For example, the mobile device could store a code associated with a gift for the recipient. The code could include any necessary data to achieve the payment of the gift. For example, it could point the system to a secure location for the giver's payment account and the recipient payment account, or to another holding account. The code could indicate that they recipient has a $50 gift card for the restaurant Olive Garden. When the NFC system communicates with the mobile device, the mobile device and the NFC system exchange the code in order to pay for the meal as well as apply the gift.

In yet another aspect, the notification 206 can include options presented to the recipient for managing the gift card. The notification to the recipient can state, "George has provided you with a $50 virtual gift card to any restaurant of your choice. If desirable, please select from the following options." In this example, the giver did not specify a particular restaurant but only provided that the gift card was for the recipient to go out to dinner. Thus, the card was provided for a class of goods or services (food). The notification is one opportunity for specific restaurants (as members of the class) to seek to obtain additional business. The notification can include an option selectable by the giver or the recipient, e.g.: for Olive Garden, Red Lobster, or P.F. Chang's. Additionally, communication with the various databases associated with these restaurants can include additional information such as P.F. Chang's offers an additional $5 if the virtual gift card is used at P.F. Chang's. This provides an upselling opportunity available to the merchants. The method can include receiving information associated with a giver giving a virtual gift card for a class of items such as restaurants, or hardware stores, or grocery stores, etc. Data is then retrieved for the specific species of that class and potential offers that can be associated with each of those species.

Thus, a database is accessible while processing the gift card, in which offers from Olive Garden, P.F. Chang's and Red Lobster are determined to be available. Options can be presented to the giver for selection to upsell or cause them to want to add the offers to the base gift card. These offers are combined with the notification that is sent to the recipient, if any optional notification is sent. The system presents a communication to the recipient and receives a selection of one of the species. Assume that the recipient sees an offer for the Olive Garden in which an additional $5 is added to the virtual gift card amount. The system then handles the entire transaction such that when the recipient uses their credit/debit card at the Olive Garden, the $50 is applied to the transaction as well as an additional $5 from the Olive Garden. This $5 can be a coupon discount or an additional transfer of money to the recipient's account from the Olive Garden or some other entity during or following the transaction. The policy can manage the final transaction with all the various participants, giver, recipient, merchant, and others.

The system can present an additional option in the communication where the recipient does not select any of the species of the class but merely desires to receive the virtual gift card for use at any restaurant. This option can be a default setting. In such a case, the recipient receives the notification they received a virtual gift card for a restaurant but selects no specific restaurant. The next time the recipient goes to any restaurant and uses an appropriate payment mechanism according to the policy for the gift card, the system (such as an acquiring bank or other node or control engine in the system) applies the virtual gift card for $50 to that transaction and the species options which were presented in the communication are cancelled at that stage and no longer viable.

Where a genus (such as restaurants) is applied in the policy, and where the system scans the recipient transaction history to determine whether a triggering transaction exists, there may be some ambiguity in the recipient payment history regarding whether a purchase was at a restaurant. In such a case, the system may initiate a confirming interaction via a communication with the recipient to confirm that the purchase last night at 6 PM at "Mama Lucia's" was a restaurant. If that is confirmed by the recipient, then the system implements the gift card policy for that transaction.

In one aspect, the virtual gift card is associated with a group of payment mechanisms for a single giver and/or recipient or for multiple givers and/or recipients. For example, the virtual gift card can be tied to a VISA debit card and an American Express credit card. A transaction at the restaurant using either one can trigger the application of the funds associated with virtual gift card to the recipient payment account, the merchant account or in any other fashion. In another aspect, the virtual gift card is tied to a checking account shared by a husband and a wife as a recipient pair. A transaction at a restaurant made via either spouse's check card or a physical check can trigger the virtual gift card. The giver can specify a recipient routing number, such as the routing number printed on the bottom of a physical check, so that the system can apply the virtual gift card to the recipient's checking account. A debit card used on that checking account can also trigger the gift card transaction. In each case, the virtual gift card can have a policy associated with its redemption that the system monitors recipient purchasing transactions and follows with respect to transferring funds.

The policy can also be very general and does not have to require a purchase. For example, the policy may monitor other events such as device location, news data or receive later input. For example, if a group of people desire to each give $50 to a office pool, then each person may have their VISA registered with the system and enter the pool and have $50 withdrawn from their account. Then the policy can be implemented such that a user or a manual or automated trigger will cause the pool of money to be provided to one of the members of the pool. Thus, if somebody guesses the right time that a baby was born or picks the right team in an office pool, then the triggering event, which occurs later, can be the cause of the transfer of the pool of money to one of the recipients payment account. Accordingly, the policy can be general and does not have to be triggered by a purchasing account transaction. Where the policy does not involve a purchase, it still can trigger the transfer of money to a recipient account. The trigger might be the high temperature of the day in town. It can be any event such as device location.

When the system receives information associated with the giver and the recipient, the species options that are presented in the above scenario can also be geographically selected. The location of the recipient is known based on information in the database, a mobile device location, a recent purchase, and/or other sources, and the system can identify and present an initial set of specific businesses to the recipient. This option can also be dynamic. A recipient living in Virginia can be notified of receipt a virtual gift card for any of a series of species restaurants that are within 10 miles of their home. If the recipient travels to Italy, and use of their credit card or other location-based mechanism indicates that they are now in Rome, a follow up email can be provided with a new set of offers associated with restaurants within the vicinity of where the credit card is actually being used. In this scenario, the earlier offer can be cancelled, modified, or maintained. In any event it is preferable that once in Italy, if the restaurant in Italy provides an additional upsell offer for use in association with the virtual gift card, then once that payment mechanism is used according to the new offer, all offers are then cancelled and considered fulfilled. The merchants can attach additional limitations to their upsell offers as well, such as "minimum $25 purchase", "valid until November 31$^{st}$", "for use at the Baltimore location" or "valid Wednesdays only". These variations represent different features illustrating how the policy can manage any given gift card. As can be appreciated, the variety of policies that can be applied to a gift card to manage how its payment is triggered is endless and all such variations are considered within the scope of this disclosure. Policies can mix timing, geography, location, classes/species of goods and services, individuals, groups of purchases (i.e., a series of items purchased that are related or associated according to the policy) and so forth.

Location-based data can also trigger an offer to a giver. Assume a recipient, Rachel, who previously received a gift card for the Olive Garden from a giver George, is again at the Olive Garden. Rachel's location as identified by her mobile phone, either automatically or manually such as based on a check-in to FourSquare, can trigger a notice to George that states, "Rachel is at the Olive Garden. Do you want to treat her to dinner?" A preauthorized offer already associates the giver payment account to the recipient payment account. If George says "Yes" or otherwise confirms the notice, the system can trigger the transaction. A communication to Rachel of any type, including a connected telephone call, can notify Rachel that George is treating her to dinner and to use her Visa card in the normal fashion. However, no communication is necessary.

The system can notify the merchant from which the recipient is making the purchase, such as Red Lobster. Location-based services can identify that the recipient of a Red Lobster gift card is at a Red Lobster location. Money could then be transferred whether the recipient makes a purchase or not. The notification can inform the wait staff at Red Lobster that it is the recipient's birthday and request that they sing "Happy Birthday" to the recipient. Alternatively, the notification to the merchant can provide some information regarding recipient preferences for food, products, or service, such as "the recipient prefers Diet Coke with no ice". Then the wait staff can act on the notification information to provide customized service to the recipient in such a way that the experience is a pleasant surprise to the recipient. In this manner, the merchant can know of people who are at their location and have gift cards. Such data can provide the merchant with a mechanism to identify the recipient, such as a photo because the recipient has yet to use their credit/debit card for the purchase. In this scenario, a location-based service can identify that the particular person is at the merchant because of their handheld device, and a communication with a control engine managing the gift cards can identify that a gift card for the merchant is available for that user. The merchant can receive a photo ID of that patron even before they would pay for their goods/services to provide the enhanced level of service based on the information they receive.

Using such location based services, the system can trigger the implementation of the policy. For example, the system can receive an identification from a giver regarding a merchant or merchants for a gift. The giver can pay using their credit or debit card or any other payment mechanism. Next, the system would establish a policy which tracks a location of a recipient device. Thus, if the gift from the giver is for a purchase at Olive Garden, when the recipient goes to Olive Garden, either a manual or an automated transaction can identify that their physical location is at the Olive Garden. In one aspect, the system may present the recipient with an interface when they are at the Olive Garden asking their location and whether they want to redeem the gift. If the recipient confirms that they are at the location, then the system would implement the policy and transfer the gift amount from the giver account, or a holding account, or any other account, to the recipient account. Therefore, as the user goes to the Olive Garden, they can confirm their location, receive a transfer of a gift amount, which can then be used to purchase dinner at the Olive Garden. This can also be used, in a similar way to the "dinner and a movie" concept by enabling the giver to identify a number of different locations at which, when the recipient goes to one or more of the locations, the recipient would have the money transferred. In one aspect, the policy may involve a timing element as well, in which the user may have to go to a first location, and either automatically or manually confirm that they are at that location, and then move to a second location either independent of time or within an identified period of time, to complete the policy. Thus, in this example, a giver could identify the Olive Garden and a movie theater such that the gift could be given to the recipient for a dinner and a movie. However, the triggering events in this case are location based rather than purchase based. The user could go to a restaurant and confirm that they are there, at which point the first part of the policy would be implemented. No purchase, however, would need to be made. Next, if the user goes to a movie theater within a three hour period of time according to the policy, then the second part of the policy is achieved and the system would then transfer the money to the recipient account. Indeed, it is anticipated, that the user, once having the money transferred, and while being at the particular location, would proceed to actually make the purchase. However, that is not necessary in this scenario. As with the other virtual gift cards disclosed herein, the recipient can receive delivery of the gift card via an email, SMS, or Facebook notification. Any mechanism of notifying the recipient that a gift card exists with this particular policy can be made. Indeed, in one aspect, the recipient does not even need to know until they are at the location that the giver has given them a gift card with a policy that is triggered on location based information.

In another example, a triggering event that is location based could be a confirmation that the recipient device has been to a set of locations according to the policy. The set of locations could be also ordered. For example, a user may need to go to a first location, followed by a second location, followed by a third location, and so forth. In this aspect, the locations must be visited in the appropriate order according to the policy. If the locations are visited in the correct order, then the policy kicks in and money can be transferred into recipient account.

The policy could be that the user only has to go to one of a set of locations. For example, the giver may choose Olive Garden, Home Depot, and Red Lobster. The gift amount may be for $50. In that case, the recipient only needs to be at one of those locations to have $50 transferred to their account. The policy could also mix location based and purchase based. For example, the policy could include the combination of the user being at the Olive Garden and making a purchase of at least $20. At that point, the policy would kick in and reimburse or transfer $50 to the recipient account. The blending of these location and purchases could also be such that the user needs to go to at least two or three locations and make one purchase. Thus, if a giver knows a recipient is going to shop for a pair of jeans and likely will go to a number of locations to look for jeans, the policy may include that the user has to go to at least two stores and then make one purchase, at which point the money is transferred. Furthermore, the triggering event under the policy can be any type of combination of detectible events. For example, any one or more of location based, external data based (such as news, sports scores, weather, birthdays, calendar events in one or more contacts' calendars, communication events such as emails, texts or phone calls, etc.), purchase events, and so forth. The policy can receive data from any number of sources to finalize a triggering event which would then cause money to be transferred to a recipient account.

Next, block 208 indicates that the recipient makes a qualifying transaction. An example of a qualifying transaction is simply the recipient using their credit/debit card to purchase dinner at the Olive Garden. The simplicity of this approach is that there is no code, separate physical gift card, or any other step that needs to be taken in order for the recipient to enjoy the benefits of the $50 gift. The recipient simply needs to make the purchase in the normal manner in which they would purchase such an item. The new result of the concepts disclosed herein is a simplification of the giving and redemption of gift cards such that no money is ever lost or failed to be redeemed due to policies that can manage the process of handling any remainder funds such that they are never lost. The qualifying transaction does not even have to be a purchasing transaction. The qualifying transaction may be data entered in by a user that causes the policy to be triggered. For example, the data that is entered may be just a name of one of a member of a group that has won an office pool or should receive the payment of a pool of money that is retrieved from each of a group of giver accounts.

Figure 2B:
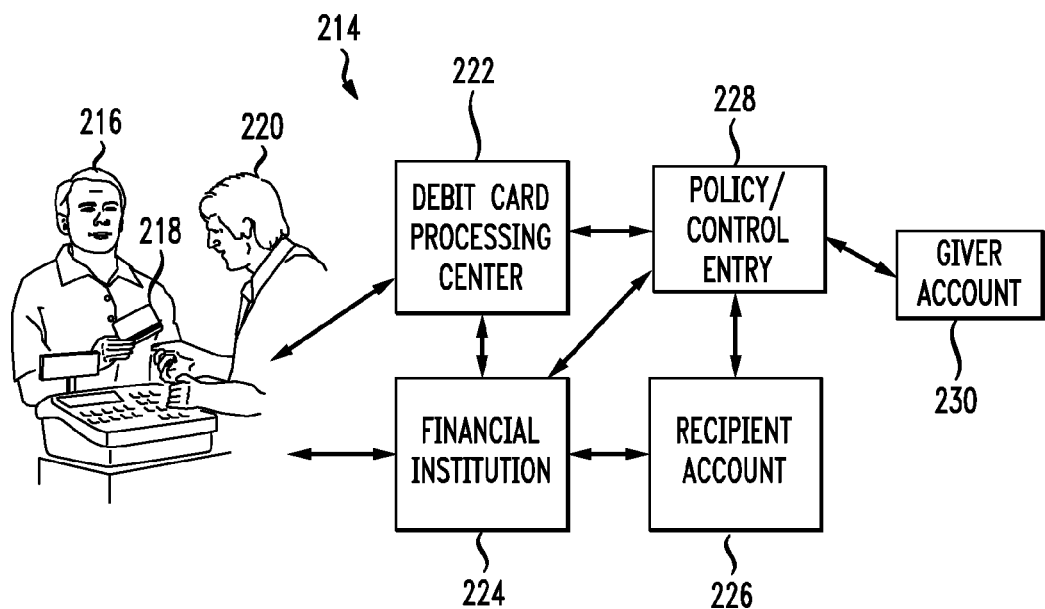
FIG. 2B illustrates an exemplary debit card processing architecture.
Figure 2C:
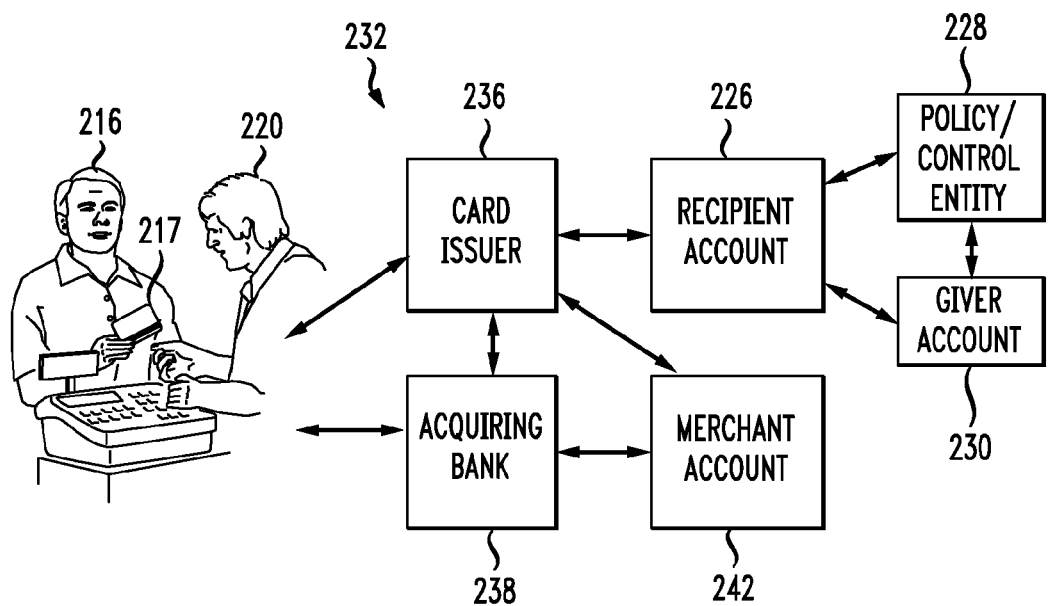
FIG. 2C illustrates an exemplary credit card processing architecture.

Another aspect of this disclosure involves the recipient making a qualifying transaction using a wireless device. For example, FIGS. 2B and 2C show a user providing a credit card 218 and 217 respectively to a merchant to complete a purchasing transaction. However, the user 216 may accomplish the same financial transaction using a handheld device such as an Iphone or a Blackberry. In one example, a near field communication can occur between a user's wireless device 218 and a merchant device at a point of sale. Bluetooth or any other wireless communication protocol can be used. In that case, to achieve the appropriate transaction, a "handshake" communication would occur between the wireless device 218 and a merchant device such that a confidence level is achieved that it is the appropriate user having the wireless device to complete the transaction. A personal identification or other identifying mechanism can be used to confirm that the wireless device has not been stolen and that it is the owner or authorized user of the wireless device that is actually making the purchase.

Indeed, such a transaction can also occur via a WiFi or cellular or base station utilized protocol. Any wireless communication link can be used to complete this transaction. Generally speaking, the wireless device will store payment account information such that once an appropriate communication between the wireless device 218 and a merchant device occurs, data can be communicated to identify which payment account from the buyer should be utilized to withdraw funds to make the purchase.

Applying this wireless device purchasing approach to the other disclosure herein can involve several additional features. For example, if a policy exists for a purchase at Best Buy of $50 by a giver John Doe to a recipient Jane Doe, then Jane Doe's wireless device can have stored thereon information which can implement the policy. For example, when Jane Doe makes the purchase at Best Buy, a notification can be sent either through her wireless device or through the payment processing system of the merchant that the purchase is taking place or has taken place and that the policy should therefore apply a $50 rebate to Jane Doe's account from John Doe.

In one example, Jane Doe's device may already have stored there on the policy and account information for both Jane Doe and John Doe. For example, if the policy is for a $50 gift card from John Doe, and Jane Doe is making a $70 purchase, the communication between her wireless device and the merchant device may include a code or data which causes the first $50 to be paid by John Doe's payment account and any remainder amount ($20 in this example) to be paid by Jane Doe's account. Such data could include the specific credit card information which is kept in an encrypted form on a device or may involve communications wirelessly with a network-based data source that can affect the transaction in the network. Either way, the policy is implemented and Jane Doe will receive the benefit of the $50 gift card given by John Doe when the transaction occurs via a mobile device.

In addition, this concept of utilizing a mobile device to make the purchase can also enhance the opportunity of presenting messages and notifications to the user of the mobile device at the time of purchase. An application can be presented in which the user can instantly receive data about the particular gift card, coupon or other type of transaction that can apply for the recipient at the time of that purchase. For example, when making the transaction, the application can present a message to the user that says something like "Congratulations Jane, $50 of this purchase has been paid for by John Doe. Happy Birthday!" Other data can also be added such as merchant advertising or other offers. For example, the merchant may have added $5 to the gift card via a merchant portal, discussed more fully below. Such merchant based messages can also be provided which can enhance the goodwill and purchasing experience of the user when using their wireless device. Clearly, many such types of interactions can occur when the payment mechanism is through a wireless mobile device having a screen rather than just a credit card that stores a credit card number on a magnetic strip. Accordingly, any of these types of communications, offers, musical tones, and so forth can be provided at this time. This is because at the very point of a decision to make a purchase, a merchant is likely to want to make the experience as beneficial as possible. For example, the merchant may provide a certain ringtone or jingle to the user when making a purchase at their store using their own mobile device which can receive that data and provide that extra aura around the purchase which is only possible when communicating with such a mobile device at the time of purchase.

Block 210 indicates applying at least part of the amount to the transaction. Assume that the virtual gift card amount was $50 and the transaction was $40. The system applies $40 of the $50 to the dinner at Olive Garden. The system can hold the $10 for future purchases at the Olive Garden or handle the $10 in various other approaches according to the policy for the gift card as described further below. The recipient can establish, via policies, a preference to use only a portion of the gift card amount for a first transaction and reserve the remaining portion of the gift card amount for a second transaction at a later time.

The system can apply at least part of the amount to the transaction in a variety of ways. FIG. 2B illustrates an exemplary debit card processing architecture 214. For example, assume the recipient 216 uses a debit card 218 for the qualifying transaction. In the debit card processing infrastructure 214, the recipient 216 presents the debit card 218 to a merchant 220 at a point of sale. The merchant 220 or recipient 216 swipes the debit card 218 through a scanner or otherwise obtains the debit card number, such as by entering the number into a computing device. The merchant system contacts the financial institution 224 indicated by the debit card number, either directly or through a debit card processing center 222. The financial institution 224 verifies that funds are available in the recipient payment account 226 and approves the transaction by immediately (or nearly immediately) withdrawing funds from the recipient payment account 226 and transferring the funds to the merchant 220. In this debit card processing infrastructure 214, if the debit card account only has $20 in the account (and the purchase was for $40), then the policy/control entity 228 can dictate to apply at least part of the gift card amount to the transaction. The system identifies that the recipient wants to use the debit card for a $40 transaction, whereas they only have $20 in their account, the system can credit $20 to the recipient payment account 226 from the giver payment account 230 prior to completing the transaction, at which point the debit card can be used to complete the transaction. If the recipient payment account 226 has sufficient funds, then the system can process the qualifying transaction in a normal fashion, and then credit the recipient payment account 226 the appropriate amount of $40 from the giver payment account 230 after the transaction with the merchant is completed.

In another aspect, a system directly pays the merchant 220 associated with the qualifying transaction at least a portion of the amount from the giver payment account 230 based on the transaction. For example, once the recipient uses their debit card 218 in the qualifying transaction, a separate transaction occurs in which the system pays $40 to the merchant from the giver payment account 230 at the time of the transaction and the $40 does not pass through the particular debit card account of the recipient. Other acquiring banks or intermediate accounts can be used to hold money and process it either immediately or in batch modes at a later time. The particular processing can depend on the characteristics (credit/debit/other) of the giver payment account, recipient payment account, merchant account, acquiring bank account, etc.

Additionally, the recipient can choose to apply the entire gift card amount, part of the gift card or none of the gift card in a purchase transaction. In this way, the recipient can control spending by choosing to pay from their own pocket for a purchase now and save their gift for later, when perhaps a particular item is on sale or when the recipient knows they will need additional funds, such as from a gift card to make purchases. For example, a recipient can inform a merchant to not apply a particular gift at the time of purchase because the recipient knows that on Black Friday the Dremel Multimax power tool at Home Depot will be half off. The recipient knows that Black Friday is a big spending day and that she typically overspends that day. She can choose to redeem her gift card on Black Friday to help control her spending.

FIG. 2C illustrates an exemplary credit card processing infrastructure 232 in which the system can credit the recipient payment account at the time of sale or shortly thereafter. In a credit card processing infrastructure 232, the issuer 236 of the credit card 217 lends money to the recipient 216 to be paid to a merchant 220. In most cases, the merchant 220 and/or the recipient 216 swipes the credit card 217 through a machine known as reader. If the card issuer 236 approves the transaction, an acquiring bank 238, which receives credit card transactions from the merchant 220, then credits the merchant's account 242. A credit card association (not shown) may also be involved to set the terms of transactions for merchants, card-issuing banks and acquiring banks. The merchant 220 can pay the acquiring bank 238 a fee for processing the transaction. Once approved, the card issuer 236 posts the transaction to the recipient's account 226. At the end of the billing period, the cardholder 216 receives a credit card statement from the issuer 236, at which time payment for the transaction is due. In this credit card processing infrastructure 232, the system can credit the recipient payment account 226 when a bill is due, such as a monthly credit card bill, shortly before or on the due date. In this way, the system can hold on to the money, potentially earning interest on the money until the last minute it is needed to satisfy the gift card transaction. This floating period can be one source of revenue to fund the gift card system infrastructure and/or to provide a profit to the operators of the gift card system infrastructure. Also shown in FIG. 2C is a policy/control entity 228 and the giver payment account 230 which are used to communicate with, monitor and manage the gift card transactions according the principles and concepts disclosed herein.

If the system 214, 232 processes gift cards in a batch or delayed mode, it can on a periodic (daily, weekly, monthly, etc) or triggered basis (upon a large transaction, or two weeks after the creation of the gift card, or one week after a known birthday, etc.) review the transaction statement of the recipient to scan for qualifying transactions. For example, if a recipient makes a purchase at the Olive Garden, the structure and data in the credit/debit card statement is known. The system can scan the statements for Olive Garden transactions, identify dates, locations amounts and/or any other relevant data that is needed for a particular policy, and then apply the policy accordingly to transfer money from the giver payment account to the recipient payment account. Again, the variations between giver and recipient payment accounts being debit, credit accounts or other types of accounts can be considered such that the system achieves the transfer of money or available credit or other compensation to the recipient.

The system 214, 232 can process credit cards and apply virtual gift cards in real time (or substantially real time) or in batches. A merchant that processes credit cards typically has a merchant account for receiving credit card payments. If the merchant accepts many credit card payments, the merchant can process credit cards in batches rather than one at a time. In a batch-based approach, the merchant accepts payment via credit card from a customer and submits the payment to the merchant account. Then the acquiring bank, or an organization that accepts payment on behalf of the merchant, checks the customer's name and credit card number for authenticity. The acquiring bank can also check the transaction and the amount with the bank that issued the credit card. The acquiring bank holds onto the payment while validation takes place. If all checks are valid, the system generates an approval code and the merchant keeps that code together with information relating to the sale. The merchant can store authorized cards in batches and send the batch to the acquiring bank each day at close of business and/or at some other interval. The acquiring bank can send the batch to a credit card association (not shown) that debits the customer's accounts and credits the appropriate account. Once the acquiring bank receives payment from the credit card issuer, the acquiring bank pays the merchant, optionally minus a processing fee. Although batch processing can be convenient for a merchant, there are times when he or she may not benefit from it. The same or similar principles can be applied to process virtual gift cards in batches. The virtual gift card processing system can be a separate entity that intercepts the flow of the authorization process, or can be integrated as part of any or all of the acquiring bank, card issuer, merchant point of sale, giver/recipient payment accounts, credit card association control, and so on. In one example, as a gift card is established, a code or a module is established to monitor the recipient purchasing activity using the recipient credit/debit account(s) 226. When a triggering transaction occurs (purchase at a restaurant, particular merchant, or a series of purchases occur), the system can notify the policy/control entity 228 and then receive further instructions on how to consummate the transaction for the gift card and handle any further processes such as remainder amounts of money on the gift card, and so forth. All variations on actual implementation are included within the scope of this disclosure with respect to locations within the system where certain processes take place.

In all of these scenarios, the management of the transaction and transfer of funds are transparent to the giver and the recipient in that the system conducts the actual purchasing in the same way the recipient would purchase the product or service with the debit or credit card and without a separate gift card, code, or certificate. Just as credit card companies receive a small percentage of each transaction, the gift card system disclosed herein can also deduct a small percentage of each gift card transaction, share it with the credit card, or debit card system. The gift card managing entity 228 can obtain payment for use of the gift cards in a variety of ways.

Feature 212 of FIG. 2A is an optional feature that represents a notification to the giver and/or the recipient after the transaction. One example of this step includes providing information on a physical receipt associated with the qualifying transaction, stating something like "Happy Birthday Mom. I hope you enjoyed your dinner." The notification acts as a reminder that the giver provided the virtual gift card for that particular transaction. Email notifications can also be provided to the giver, recipient, and/or a third party. After the giver gives the virtual gift card, the giver may desire to receive a notification when the recipient redeems the. After the giver sends the virtual gift card, the giver can receive an email that identifies that the recipient used the gift card for dinner on a certain date. Any timing mechanism can be applied. Furthermore, the system can send an email or other communication to the recipient after the qualifying transaction that can provide a further personalized message from the giver such as "I hope that you enjoyed your dinner, thanks for all you do." The after purchase notification can also include details about the policy for any remainder amount. The notice can state "I hope you enjoyed your Olive Garden Gift Card! You have $15 remaining on this gift card for your next Olive Garden purchase. After 6 months, if not used, the $15 will be transferred to your debit account automatically [or be cancelled, or be transferred to a third party, or any other option according to the policy]."

Third party notifications are not limited, however, to the merchant and the system can send a notification to any other person or entity. For instance, a brother who gives his sister a gift card for her birthday can instruct the system to notify her husband when she has redeemed it and what it was redeemed for so that the husband does not purchase the same or similar item for her birthday or so the husband can purchase a matching accessory.

The new process outlined in FIG. 2A provides an easier mechanism to transfer a virtual gift card money amount from a giver payment account to a recipient payment account in a manner that is transparent to the recipient. This process can be managed by a specific policy such that even if the gift card amount or remainder is forgotten, it is never lost and always managed according to a policy. Reminders can be sent prior to the remainder amount being cancelled or transferred to an account. The gift card is redeemed through an existing payment mechanism for the recipient and requires no codes, physical gift cards or coupons, and includes policies, reminders or processes to assure no money is forgotten or lost.

Often recipients will have multiple gift cards with varying amounts that they lose track of or have little incentive to redeem. These approaches provide a new result of reducing the barriers to obtaining a greater benefit from a gift card with far less effort on the part of the recipient and/or the giver.

Figure 3:
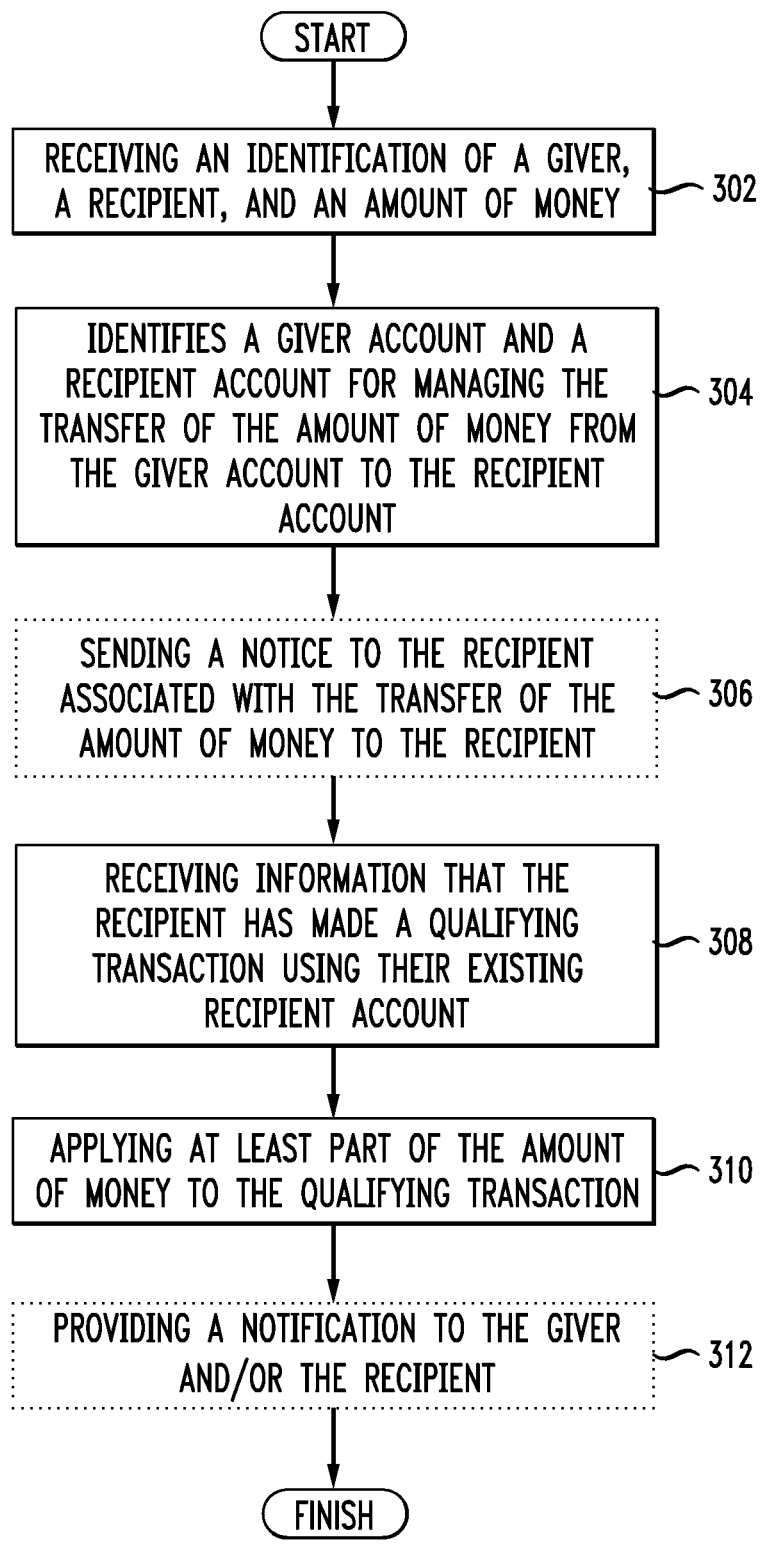
FIG. 3 illustrates an example method embodiment for processing a virtual gift card.

FIG. 3 illustrates an example method embodiment for processing a virtual gift card. The method may be practiced by an individual computing device or a computing device in communication with other computing devices within a network. One or more of the various computing devices can reside in a merchant bank, an acquiring bank, a giver payment account, a recipient payment account, a merchant, credit card association, a policy control entity or engine, and so forth. The system receives an identification of a giver of a gift card and a recipient of the gift card at a first time (302). The system identifies a giver payment account and a recipient payment account for managing the transfer of the amount of money from the giver payment account to the recipient payment account (304) or to a merchant bank according to a policy. The recipient payment account can exist prior to the first time and can be an open-loop payment mechanism that is not restricted to a particular merchant or shopping portal, such as a credit/debit card or checking account. An optional notice is sent to the recipient associated with the transfer of the amount of money to the recipient (306). As is shown above, the giver payment account and the recipient payment account each are an established account such as a Visa, MasterCard or American Express credit card and the like or a debit account. The information that is received in step 302 can further include a transaction processing policy such as how to handle the money amount if the recipient does not engage in a qualifying transaction within a certain period of time, and so forth. The policy can transfer any unused funds in the gift card to the recipient credit/debit card account after six months or based on any timeframe. One alternative to the method described in FIG. 3 is for the system to invite a potential recipient to establish a recipient payment account if one does not exist. The system can send a message in any form such as orally, text message, email, voicemail, etc. inviting the potential recipient to set up an account. The message can explain that someone wishes to give a gift to the potential recipient but that the potential recipient needs to setup an account for the gift giving to occur. The giver remains anonymous or the giver may reveal himself in the request for account setup. The message may optionally include a link to a page requesting the potential recipient's name and credit card information so that the recipient's account can be established easily. This scenario is useful when helping the technologically challenged navigate through the account set-up process.

Another alternative to the method described in FIG. 3 is for the system to set up accounts through another person for children or those that do not have credit/debit cards. For example, a mother can setup a giver or recipient payment account for her teenage daughter who does not yet have a credit/debit card with the mother's card information. The mother can make redeeming purchases on behalf of her daughter. In this way, it is possible to establish user accounts for the technologically challenged or underage givers and recipients.

The system receives information that the recipient has made a qualifying transaction using their existing recipient payment account (308), the transaction occurring at a second time which is later than the first time. The system then applies at least part of the amount of money to the qualifying transaction (310) in a manner according to whether the transaction is a credit or debit transaction for both the giver and the recipient. The system can apply the amount of money to the purchase to yield a remaining amount of money. Upon the recipient using the recipient payment mode to make an additional purchase, the system can apply the remaining amount of money to the additional purchase in a manner associated with the recipient payment mode or transfer the remaining amount to the recipient. Alternatively, the system can apply the amount of money to a purchase by processing a purchase history associated with the payment mode to identify a previously made purchase, and applying the amount of money to the previously made purchase.

An optional feature is the system providing a notification to the giver and/or the recipient (312). In one aspect, a transaction can trigger the use of more than one virtual gift card. For example, if the recipient purchases an item from Home Depot for $95 and has two virtual gift cards to Home Depot, one for $20 and one for $40, then the system can apply all available virtual gift cards up to the purchase price. The system can apply both gift cards for a total of $60 such that the recipient ends up paying $35 for the item.

The system can receive an identification of a giver of a gift card and a recipient of the gift card, and associate the giver with a giver payment account and the recipient with a recipient payment account. The system can associate a policy with the gift card and monitor transactions of the recipient using the recipient payment account. Then the system can receive information based on the monitoring that the recipient has made a transaction using the recipient payment account according to the policy, and apply an amount of money from the giver payment account for the transaction according to the policy.

The system can optionally receive a condition from the giver, and apply the amount of money to the purchase if the purchase satisfies the condition or according to a policy. The system can implement this optional step via one or more policy enforced at a merchant, acquiring bank, control engine, merchant bank, issuing bank, and/or other level in the virtual gift card processing infrastructure. The condition that dictates the policy can restrict the virtual gift card to a retailer, a group of retailers, a geographical region, a class of goods or services, an item, a time range, a date range, and/or a maximum per-transaction value. The system can apply gift cards based on policy limitations. For example, if a recipient has multiple virtual gift cards to a same merchant, when the recipient makes a purchase at that merchant, the system can apply the virtual gift card with the earliest expiration date. Alternatively, the system can credit the merchant at the time of the transaction, and then initiate a dialog with the recipient at a later time to determine which of the available virtual gift cards to apply to the transaction. If the recipient does not indicate which virtual gift card to apply, the system can apply a default virtual gift card. Any entity within the virtual gift card processing infrastructure can subtract a service fee (flat fee and/or a percent) from the amount of money associated with the virtual gift card. The service fee can be a recurring fee, a one-time fee, a per-purchase fee, and so forth.

The system can optionally receive from the giver a request to establish a subscription, the request indicating at least one subscription requirement. Then the system can establish the subscription to automatically apply a subscription amount of money to transactions of the recipient or applies a gift card amount according to a policy based on the at least one subscription requirement. The policy may involve just transferring money from a giver payment account to the recipient payment account. For example, the giver can set up at the beginning of every year a schedule of gift cards one week before the birthday of his or her family members and five best friends. The system can automatically carry out the notice and processing of the gift cards throughout the year. If a parent has a child at college, the gift card can be for any grocery store and a subscription causes $200 to be applied at the beginning of each month. This policy easily enables the recipient to simply use their virtual gift card (credit/debit card) at a qualifying merchant (grocery store) and it is applied on schedule according to the subscription policy.

Givers and recipients can receive notifications associated with the virtual gift card. For example, the system can notify the recipient of at least one of the amount of money, a condition associated with the amount of money, the payment mode, and the giver. The system can also notify the recipient that the amount of money was applied to the purchase, transmit a stored message to the recipient from the giver, and/or send a notification to the giver that the amount of money was applied. Notifications can include a description of an object of the purchase to which the amount of money was applied, a purchase time, a purchase date, and a merchant. The system can send notifications via email, SMS, instant message, tweet, social networking, automated voice call, physical mail, and/or any other suitable communication medium. The giver or recipient can interact with the notifications to be presented with options or information about the current policy for the gift card, and can interact with the notification to change the policy or modify how the gift card will be handled in the future. The recipient may want to regift the remainder amount to a third party and such option can be presented via a notification and then carried out under a new policy for the remainder gift card.

The system can provide for regifting of a virtual gift card by receiving a request from the recipient to transfer at least part of the amount of money to a third party and/or another virtual gift card still belonging to the recipient but having different policies. The transfer can be not as part of a purchase. Then the regifted gift card can then associate the at least part of the amount of money with a third party payment mode. Upon the third party using the third party payment mode, the system applies the at least part of the amount of money to the purchase in a manner associated with the third party payment mode. Part of the gift card may be managed by one policy and another part (the regifted part) by another policy.

Virtual gift cards can include bonus offers from third parties. The system can receive a bonus from a third party and add the bonus to the amount of money. The bonus portion of the virtual gift card can include its own policy or policies separate from other policies associated with the virtual gift card amount, such that when the bonus policy is satisfied on top of the other virtual gift card policies, the system applies both the virtual gift card amount plus a bonus amount to a purchase. The system can also provide notification to the giver, recipient, and/or a third party associated with the bonus that the bonus was applied by transmitting a stored message to the recipient, for example, from the third party. Such a message can be something like "I added $20 to Dad's gift card for dinner, have a big dessert!" In this manner, the system presents to the bonus giver, if authorized, information about the recipient gift cards and the identity of the primary giver.

The recipient of the virtual gift card can, in some circumstances, manage, change, or remove a policy associated with a virtual gift card. The system can receive a request from the recipient to use the amount of money to make the purchase outside the purchase condition, deduct a penalty from the amount of money according to the purchase condition to yield a reduced amount of money, and apply the reduced amount of money to the purchase in a manner associated with the recipient payment mode. As can be appreciated, the processing system disclosed herein provides much greater flexibility and possibilities when processing gift cards.

Gift Card/Coupon Processing Infrastructure

Figure 4A:
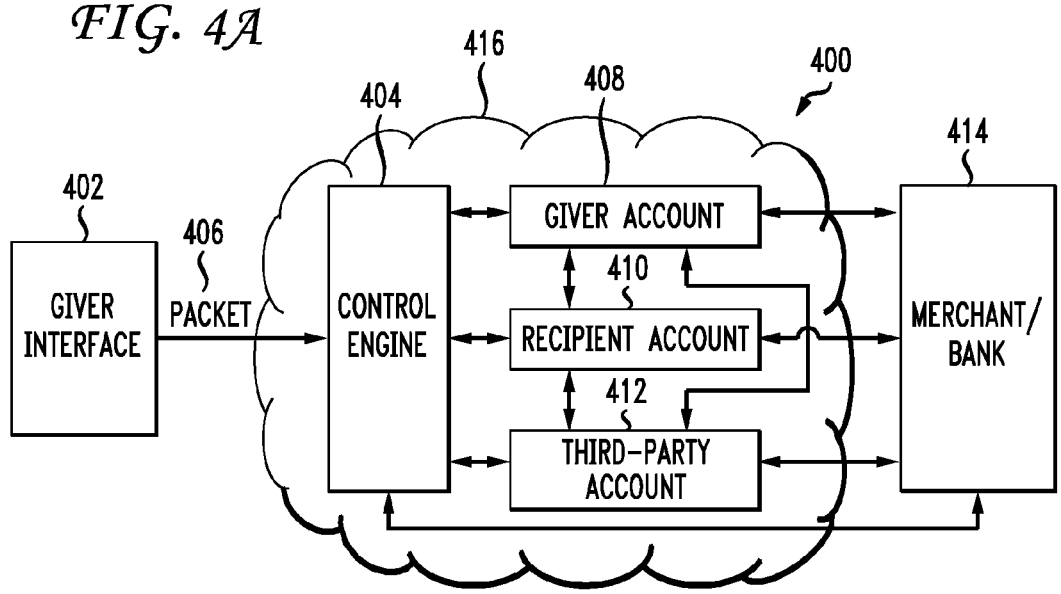
FIG. 4A illustrates a sample system configuration for processing virtual gift cards.

FIG. 4A illustrates an example block diagram 400 of a network 416 in which the system can operate. Network 416 includes various components that make the processing disclosed herein possible. A giver interface 402 is used in a variety of ways to receive initial information about the giver. For example, the giver interface 402 can simply be a web site accessible via a web browser in which there is an opportunity for the giver to provide the basic information to identify the recipient, the amount associated with the virtual gift card and so forth. The giver interface 402 can be a device such as kiosk, ATM machine, or gas pump.

The giver interface can function in different ways as well. A giver can come to a kiosk or an ATM with a physical gift card or coupon to use at a company such as the Olive Garden. The giver wants to transfer those funds for use according to the methods disclosed herein, effectively converting a physical gift card to a virtual gift card having a policy for its management. The giver can insert the physical gift card into a card reader of the kiosk that reads the amount left on the card, identifying information for the account and the restaurant such as Olive Garden. The giver can then insert their credit/debit card and the interface would therefore have the necessary information with respect to the giver (which in this case would be the actual physical gift card, a gift code, and/or a gift certificate as the "giver", the recipient, the amount and the recipient payment account). Optionally, the giver only needs to identify the recipient such that the recipient payment account can receive the gift card amount. This interaction enables a same person to be both the giver and the recipient when they have a physical gift card. This process easily facilitates the transfer of those funds from a physical gift card into a virtual gift card allowing usage of those funds via their standard credit/debit card. This provides a way for both givers and recipients to avoid the pitfalls associated with physical gift cards or with gifts requiring gift codes. This transaction, however, in one aspect, does not just transfer the money to the credit/debit card account. If the physical gift card is for the Olive Garden, the system retrieves that information from the gift card and applies it as a policy for the recipient. Therefore, the closed-loop nature of the physical gift card is carried over to the virtual gift card such that it is redeemed only at the merchant. The other aspects of the policy can also be applied, such as after six months of non purchases at the designated merchant, then the money is transferred to the recipient payment account, or any other desired policy.

Similarly, a giver interface 402 can include a website in which a giver types into a web interface a particular gift code that may or may not be associated with a physical gift card. The system can receive this information to identify an amount, the giver, and the company to which the gift card applies. Then the giver can also add their information as the recipient and therefore provide the necessary information via the giver interface for the remaining transactions to occur under the processes defined herein. In this manner, any recipient of a physical gift card can easily transfer that gift card to the virtual gift card system disclosed herein. The recipient no longer has to worry about losing the gift card or forgetting to use all the money on the gift card.

The disclosure temporarily turns to FIG. 4C, which illustrates an example packet 406 as is introduced in FIG. 4A. FIG. 4C shows packet 406 with various data fields. The exact names, types, sizes, and order of data fields in the packet are exemplary. The packet can be implemented in any variation thereof, including any combination or permutation of these and/or other data elements. These example fields include a security header 472, a general header 474, information about the giver 476, information about the recipient 478, a currency amount 480, a payment mode 482, a time associated with the virtual gift card 484, a location or geographic limitation associated with the virtual gift card 486 and another optional field 488 or fields. The amount can be in any currency: domestic, foreign or virtual. The system can automatically handle conversion between currencies, if needed. Some of the packet fields shown are optional. The use of such a packet enables a central control engine 404 to receive a single set of data associated with a gift card and carry out all of the transactions associated with monitoring recipient purchasing activities, apply gift card money as guided by the policy, and credit or debit money from the appropriate accounts.

The packet structure can allow for the information about the giver 476 and the information about the recipient 478 to identify more than one individual. The packet can include information about each giver 476 and recipient 478 in the form of, for example, an email address, name, account number, or other unique identifier. Further, in the case of multiple givers, the amount field 480 can include one or more sub-amounts corresponding to each giver. The payment mode 482 can be identified by credit card number, bank account number, routing number, club or loyalty card number, PayPal address, and so forth. In one case, the payment mode can be a user profile such that any payment mode associated with that user profile is able to use the virtual gift card.

As has been noted above, this packet, in one aspect, does not include any account information or credit card information for the giver or recipient. However, the packet does include a sufficient amount of giver and recipient information such that a control engine 404 can receive that data, and in a secure manner, identify the various accounts that are needed to transfer the money and manage the distribution of the virtual gift card funds as instructed by the packet and/or a policy. The security information 472 can be used according to those of skill in the art to ensure that at the giver interface, a fraudulent giver cannot log into the system and thereby inappropriately gain access to giver, recipient, or third-party accounts. The packet can be transmitted to a secure environment that stores the account data and carries out the transaction.

Based at least in part on data received from the giver interface 402, the system can develop a packet 406 as discussed above and shown in FIG. 9. The packet 406 includes the basic information to manage, create, trigger, or perform other actions associated with the virtual gift card and optionally the additional information. At a basic level, the packet 406 provides information about the giver, the recipient, the amount, and other management information about how the amount is to be applied. The packet can identify whether the giver payment account and recipient payment account are credit or debit accounts. The network 416 receives this packet at a control engine 404. This can represent a computing device, acquiring bank, debit card bank, issuing bank, and/or server within the network 416 that can manage the policy of distribution, use, and/or notifications associated with the virtual gift card. The control engine 404 can be part of or in communication with an acquiring bank. Network 416 can be the Internet, an intranet, a virtual private network, an encrypted network, electronic or fiber-optic network, and/or any other kind of network that can include a wireline or wireless network. Therefore, the giver interface 402 can also be a wireless interface via a wireless device with the appropriate software to enable communication of such information.

The control engine 404 communicates with the giver payment account 408 and a recipient payment account 410 and optionally with a third party account 412 and/or a merchant or bank 414. The control engine 404 can communicate with or operate on any one or more of these systems. For example, the third-party account 412 does not necessarily need to be involved in each transaction. Furthermore, the control engine 404 can optionally communicate directly with the merchant or bank 414. Accordingly, when a giver gives a $50 virtual gift card for the Olive Garden to the recipient, the control engine can utilize a default processing mechanism in which the giver payment account 408 is deducted by $50 and that money is held in a third-party account 412. In an alternate mechanism, the system deducts $50 from the giver payment account 408 and credits the recipient payment account 410 with the $50 directly but with no or some restrictions on that $50. One example of $50 being restricted or reserved is if the recipient payment account is a debit account and the giver has only $75 left in the debit account after the $50 is deposited. If the giver tries to make a $30 purchase, which would leave only $45 in the account, that transaction can be rejected inasmuch as that $50 is reserved and unavailable for use except according to the policy for managing the gift card. In either scenario, when the recipient makes a purchase of $50, for example, at Olive Garden 414, then those funds can be released from the recipient payment account according to the policy, can be successfully processed and the $50 can be paid to the merchant either directly or indirectly. In a direct scenario, the system transfers the $50 to Olive Garden's account. In one indirect scenario, the $50 is paid to Olive Garden directly from the recipient's account, and the system transfers the $50 to the recipient's account, thereby effectively reimbursing the recipient after the fact. Thus, the system handles the transfer of money according to the giver payment account (credit, debit, or other) and the recipient payment account (credit, debit, checking, cash, or other).

As has been noted above, the system can guide the flow of funds from the giver payment account 408 to one or more recipient payment account 410, the third-party account 412 and/or the merchant bank 414 in a number of ways. These varieties are disclosed above and not repeated here. In each case where gift card funds are applied to a purchasing transaction, any of the various scenarios can be used to process the gift card. The gift card funds can also be applied to non-purchase fund transfers. For example, if the recipient chooses to donate to a particular charity, the system can apply the gift card funds, still according to any policies in place, even though the donation is not a "purchase" of a good or service.

Figure 4B:
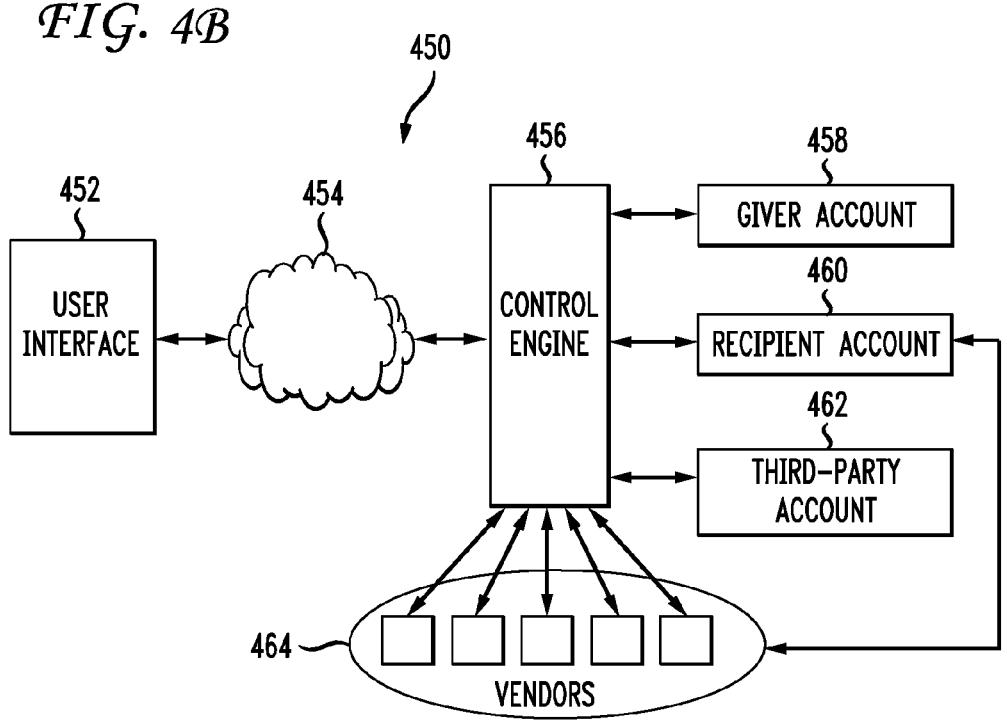
FIG. 4B illustrates a sample system configuration for processing virtual gift cards exclusively in an online retail environment.
Figure 6:
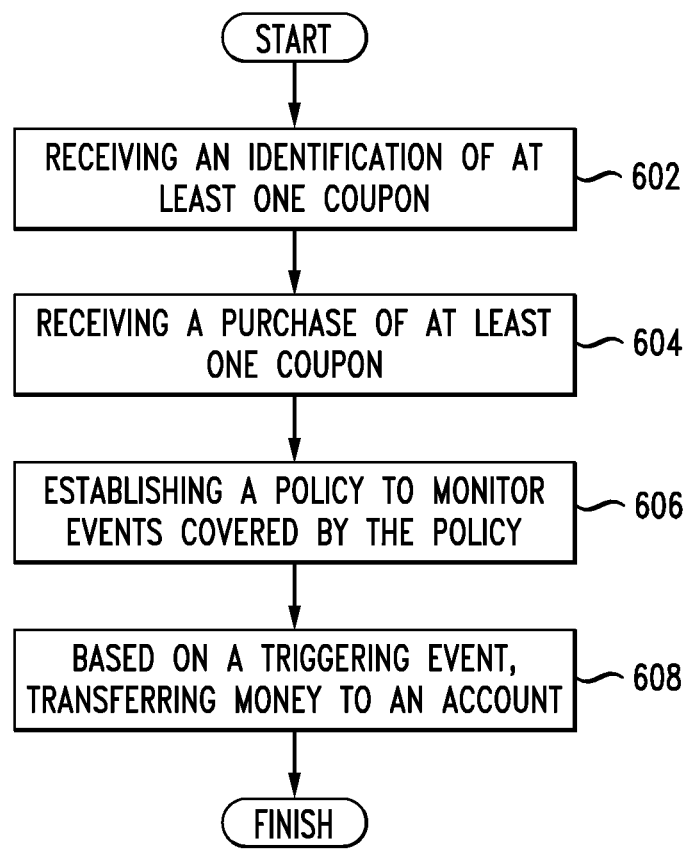
FIG. 6 illustrates a second example method embodiment related to 'coupon books'.

FIG. 4B illustrates a second example block diagram 450 of an architecture 450 in which the system can operate. The architecture 450 represents a model operated by an online merchant such as Amazon.com. For purposes of illustration, Amazon is used herein to represent a generic online merchant in which the data about the giver and recipient are stored or received via a user interaction to process a gift card as disclosed herein. A giver of a gift card communicates with the control engine 456 through a network 454 via a user interface 452. The user interface 452 can be a web browser on a desktop computer or mobile device, an application on a desktop computer or mobile device, a telephonic interface, a text-message based interface, a kiosk interface, and so forth. The actual interface details can be implemented in any of a number of different ways, as can be appreciated by one of skill in the art. The giver has an account 458 with Amazon and desires to give a gift card to a recipient having a recipient payment account 460 with Amazon. Each of the user accounts for the giver and the recipient with Amazon can be associated with underlying bank accounts, credit cards, and/or PayPal accounts, for example. In an environment like Amazon, or Visa, MasterCard, PayPal, or any other universe of users in which account information is available, the system disclosed herein can be used to easily identify givers, recipients and apply policies to exchange gift cards easily and seamlessly.

The giver provides instructions to the control engine 456 through the user interface 452 to send a gift card to the recipient. The giver can provide partial information to the control engine 456 to identify the recipient, such as an email address, username or a first name, last name, and mailing address. The control engine 456 and the user interface 452 can provide the giver a way to select which types of information to provide. As the giver enters information, the control engine 456 and the user interface 452 can also provide feedback to the giver regarding the entered information. For example, if the giver enters a mailing address, the control engine 456 can look up the mailing address in the Amazon customer database and determine that three separate user accounts list the same mailing address. Thus, the control engine 456 can indicate to the giver that it needs additional information to disambiguate which of the three separate user accounts is desired and optionally prompt the giver to provide a specific type of information to disambiguate between the three separate user accounts. When the giver has entered sufficient information to identify the recipient, the control engine 456 can display, via the user interface 452, a confirmation of the identified recipient so that the giver is sure that the correct person has been identified. This confirmation can include any information, such as text, images, a purchase history, video, audio, personal metadata, a list of friends, and so forth, pulled from the recipient's Amazon account or other information available publicly or via other channels, such as a social network via an API call.

When the giver has identified a recipient with the control engine 456, the giver also indicates an amount of money to give as a gift card and, optionally, any restrictions, conditions, or limitations on the gift card. The amount can be fixed or dynamic. For example, as discussed above, the amount can be $50 to any item on Amazon.com. Alternatively, the amount can be a gift card including a restriction to a purchase of any HP inkjet printer from Amazon.com, up to a maximum of $200. The actual gift card amount is not determined until the recipient makes a purchase of the indicated item.

Because the control engine 456 controls the gift card implementation based on policies, handles the transactions, and controls (at least indirectly) giver and/or recipient payment accounts, the control engine 404 and the merchant or bank 414 of FIG. 4A are effectively merged into one entity in FIG. 4B. As part of the process of creating a gift card, the control engine 456 can withdraw funds from the giver payment account 458 and place them in a third-party account 462 until the recipient redeems or uses the gift card. Alternatively, the control engine 456 places a hold on the gift card amount in the giver payment account 458 until the gift card is redeemed. The hold can be a reservation of available credit on the giver payment account, which is charged when the recipient redeems the gift card. The control engine 456 can implement other fund processing variations as well. In one aspect, the user accounts 458, 460 at Amazon are proxies for actual bank accounts such that Amazon can deposit, withdraw, hold, and perform other operations on funds in the actual bank accounts. The control engine 456 generates a virtual gift card associated with the recipient payment account 460.

The control engine 456 can provide an optional notification to the recipient via email, the recipient's Amazon account, or some other medium. Then, the control engine 456 monitors each recipient purchase through Amazon.com to determine if the purchase matches the terms, if any, of the virtual gift card. When the control engine 456 detects a qualifying purchase, the control engine 456 can apply the gift card funds to the recipient payment account 460, keep the gift card funds as payment for a product or service Amazon provides, or transfer the gift card funds to one or more vendor 464 of the product or service purchased. The control engine 456 can redirect a payment to a vendor 464 for a purchase so that the purchase is made by the recipient as if the recipient pays with his own account 460 but the control engine 456 performs back-end manipulations to redirect the payment out of the giver payment account 458.

In one variation, the control engine 456 can update the interface for the recipient as the recipient browses the Amazon product catalog. For instance, if the virtual gift card is $50 for any item on Amazon.com, the control engine 456 can automatically reduce the prices listed on the various product pages as the recipient browses Amazon.com to reflect what the price would be if the $50 virtual gift card were applied. Therefore, the product page for a $120 boxed set of DVDs can show $70 instead of $120. If the virtual gift card has conditions, restrictions, or limitations associated with it, the automatically updated prices can reflect that too. For example, if the virtual gift card is $30 for a microwave oven, then the product page for the $120 boxed set of DVDs can still show $120, but a page for a GE countertop microwave oven is reduced by $30. Additionally, the control engine 456 can display automatically and/or manually generated promotions that are only redeemable when purchasing a product or service with all or part of a gift card. For example, Amazon may offer 10% off specific goods or services when purchasing with a gift card. A merchant may refund a certain money amount to Amazon when an item is purchased, thus awarding Amazon for directing sales to the merchant.

Coupon Books

The principles and concepts disclosed herein can also enable a simpler, policy-based approach to enhance, modernize, and/or duplicate functionality of coupons and coupon books, which are currently based on a physical item or barcode that must be presented for a discount. The problem exists where consumers have an opportunity to buy a coupon or book of coupons. This is an approach often used locally for fundraisers. For example, schools may sell a coupon book to parents for $20 that includes 40 different coupons, gift certificates, or other promotional offers for neighborhood stores. Such coupons might be for $10 off on a $50 purchase or more at the local Sears or a 15% discount at Bob's Audio/Video Emporium. Often the stores having coupons in such coupon books are locally owned, or 'Mom and Pop' stores. Users purchase the coupon book, and then tear out and present the respective coupon for that particular store when they shop. Then the store employee has to process the coupon to provide the discount at the point of sale. This process involves printing the coupons, processing the sale, and processing the coupons themselves. Further, users who purchase these coupon books may forget to bring them along when shopping at the merchants, or may forget which coupons have been used, or may even forget about the coupon book altogether. Thus, even when a user has purchased the coupon book, and frequently shops at merchants promoted in the coupon book, many barriers hinder the redemption or application of these coupons.

One solution to these problems is moving this entire process into the cloud by using a policy to govern the application of coupons instead of relying on a physical object such as a card, a piece of paper, or some separately entered electronic coupon code. A website or other data processing system can be arranged to enable a much simpler process that removes almost all the barriers to redemption and streamlines the value chain. A coupon or a group of coupons can be established online. Assume East High School wants to have a fundraiser or a town wants to provide a 'coupon book' having 20 local coupons. However, the 'coupon book' is a conceptual coupon book that is not a physical 'book', but instead a bundle of 'coupons' or promotions governed by one or more policies. Individual stores that want to participate in the coupon book can go to a merchant-facing portal and input their data. The data could include such data as a percentage off a purchase, a particular dollar amount reduction at the time of purchase, or some other promotion or perk. The type and/or amount of the promotion can vary over time, based on results of sporting events, or some other data source. Thus, policy-based 'coupons' can be extremely flexible and can provide specific controls and rules that would be virtually impossible or at the very least impractical using traditional paper-based coupons. The particular details of the coupon are irrelevant. The system will have an identified coupon or group of coupons that a user can buy. Therefore, a user will go to a corresponding user-facing portal and select the East High School 2011 Coupon Book. The user-facing portal can provide details about each coupon. The user purchases the coupon book online, for example, using a credit or debit card or other payment account such as a bank account or Paypal account. If the coupon/coupon book is offered through a website like Amazon.com, the credit card/debit card or other payment account may already be on record and can be accessed by simply providing the Amazon.com login credentials.

By making the purchase, the system is aware of the credit/debit card number or payment account of the purchaser. The system associates the credit/debit card (or any payment account), with the coupon/coupon book and creates a transaction monitoring policy accordingly. Alternatively, if the user is purchasing the coupon book for someone else, the system can prompt the user to identify a recipient, and associate the recipient's payment account with the policy. In this regard, the recipient could receive a notification that a coupon book has been purchased for them and they only need to register their payment account. If their account already exists in this system, the giver may just have to choose the recipient. At this point, the policy starts to monitor or receive data about the purchases of the user (or other authorized person) using the payment account. The policy can also monitor non-purchasing activity for the coupon book as well. For example, the coupons could be modified or enhanced if the user goes to a particular park and then shops at a store. The policy could enhance a coupon just upon the user going to a particular location whether they make a purchase or not. External data could also cause coupons to change in value dynamically. If a certain high school football team wins a game, a coupon for a malt shop may increase by 10%. The system can pull data from external sources, such as a sports RSS feed, to determine whether or not to apply the additional 10%, or the merchant can manually enter the data, such as via a web portal or a smartphone app. The user then can simply proceed to make purchases in a normal fashion using their existing payment account mechanism, which can include their credit/debit card in their back pocket or purse or a purchase using a mobile device using near-field communications, such as with a webOS, iOS, or Android smartphone. After the user makes a qualifying transaction according to the policy, i.e., at a store at which a coupon applies from the coupon book, the system applies the coupon to that transaction and either reduces the transaction amount or provides a rebate to the user according to the details of the policy for that coupon.

Users can obtain online or via any portal a summary of their use of coupons in the coupon book. The coupon book can be associated with a dedicated smartphone application. For instance, the application can provide a simple interface for managing one or more policy-based coupon books, viewing which coupons have been used, the total savings, which coupons remain, coupon expiration dates, coupons which go well together, a map showing coupons for merchants which are near to one another, demographics of coupon book owners that have used a coupon and those that have not, timing and groupings of coupon usage, and so forth. Further, the smartphone application can allow a user to transfer a coupon from one payment account to another. For example, if the policy for the coupon book is associated with the user's American Express card, and the user only has her Visa card with her at the merchant, the user can transfer (permanently or temporarily) the policy associated with one or more coupon from one payment account to another payment account. The transfer from one account to another can also occur from one user to another user. An email, for example, can be sent when the coupon/coupon book is purchased that lists all the coupons and a description of them or a link to such data.

Then, assume the user goes to Bob's Audio/Video Emporium and rents some videos for $10. Assume the user has purchased an online coupon book containing a coupon for Bob's Audio/Video Emporium for 15% off any purchase. The system receives data that a purchase was made and an amount of the purchase. The system then, based on the policy, will provide the rebate or result of the coupon back to the purchaser. The policy stays in place until each coupon is either redeemed or a period of time for the group of coupons or for a particular coupon expires. For example, the coupon or coupon book could last for 90 days from a particular date or the date of purchase. As the user makes purchase over the period of time, the system will provide the appropriate rebates, discounts, or other promotions associated with those purchases. When the time expires, then the system stops monitoring purchases. Individual coupons could have individual expiration times. Further, one coupon's policy can be 'unlocked' or 'activated' based on another coupon being used. For example, a coupon for Old Navy may be unlocked only after using a coupon for Payless Shoes. Using a policy in this way further simplifies the process because an employee at a merchant does not have to worry about checking a coupon for its expiration date, and indeed does not need to do anything differently when processing the purchase at the point of sale. Thus, the system handles all of the rebates, price adjustments, and/or refunds automatically and the user simply shops in the normal fashion without the need for presenting a printed coupon and without any separate processing at the point of sale. The approach could of course work for online purchases as well. The redemption process will not be much different between online and point of sale purchases. Notifications can be sent to purchasers notifying them of expiration dates.

Coupons, such as those in a coupon book, can be part of a conditional group. For example, a coupon book can contain a first coupon from a window installer for $500 off new windows for the entire house, and a second alternative coupon from the window installer for $50 off each window. The use of one of the two coupons nullifies or 'consumes' the other. Thus, a conditional group policy can monitor a user's purchases at the window installer, can calculate which one is optimal to apply, which coupons are eligible for the purchase, and so forth. In another variation, two separate policies monitor the purchases, one for each of the alternative coupons. The policy can detect that multiple coupons may apply to a particular transaction and prompt the user, such as via an spoken dialog system, email, text messaging, social media, etc., to select which, if any, of the coupons should be applied to that purchase. Then, in the case of a conditional group, the policy applies the appropriate coupon to the purchase, and cancels the remaining coupons in the conditional group and stops their associated policies, if any.

An example method includes receiving an identification of a coupon or group of coupons (602). The system also receives a purchase of the coupon or group of coupons and associates a purchaser's payment account (604). A policy is established that causes the system to monitor the purchaser's purchases at the various merchants (or other non merchant purchasing events) having coupons covered by the policy (606). As purchases are made using the payment account at coupon offering merchants (or as other non-purchasing events occur), money transfers are caused to apply the coupon for the particular purchases (608). In this manner, the system simplifies the process by removing the need to print coupons and process printed coupons at merchants. Users only make purchases in the normal fashion using their existing payment account. The system can also transmit reminders such as "you've used most of the coupons in the East High 2011 Coupon Book—you still have 1 month to use the Valvoline oil change for $20." Thus, notifications and reminders can help the user know what coupons are left to use. A portal can also be offered which can give the user an electronic update on the purchases out of the coupon book.

Similarly, a manager for the East High School coupon book can view a portal that provides various statistics and analytics data regarding the coupon book sales, redemption rates, popularity, and so forth. The manager can see that a particular category of coupons is almost always redeemed, and can make a decision to keep that category in the next iteration of the coupon book. Conversely, the manager can see that one coupon in the book has a very low redemption rate and can investigate why. Perhaps the target demographic is not interested in that particular merchant, or the promotion is not sufficiently valuable. Specific demographics data associated with coupon redemption can provide additional insight. For example, one coupon in the book may only have a 10% redemption rate, but the 10% that redeem those coupons may be of high value or high importance for East High School, so the manager can decide to keep those coupons in the coupon book or coupon bundle in order to keep that 10% satisfied. The manager can even modify coupon books that have already been purchased to include additional promotions that are added later. The manager portal for coupon books can also allow an easy interface for the manager to resell to previously satisfied customers whose existing coupon books are nearly used up, or about to expire. The manager portal can also receive feedback from users who have purchased the coupon books, and provide that feedback, possibly scrubbed of personally identifying data, to the manager to guide the creation of additional coupon books. The feedback can be directed to the coupon book itself, the product or service at the merchants, the value of an individual coupon or the entire coupon book, and so forth. This policy-based approach provides enhanced visibility and transparency into customer redemption habits, which is nearly impossible to achieve using traditional paper coupons or discount cards.

Groupon & Online Payments

Figure 7:
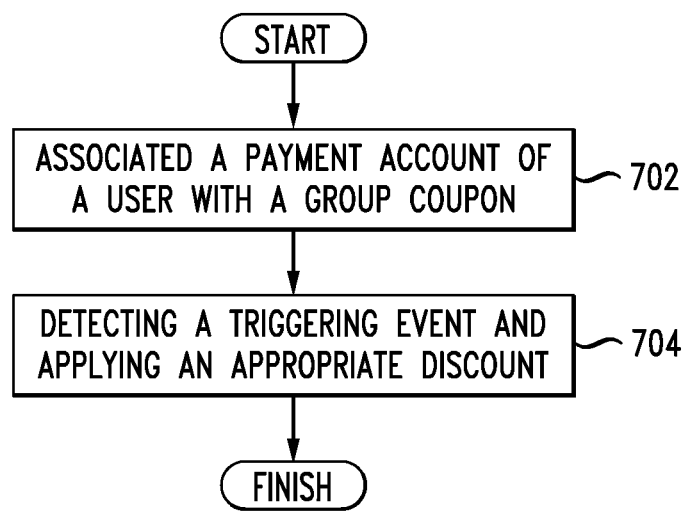
FIG. 7 illustrates a third example method embodiment related to a Groupon-like model.

Another aspect of this disclosure applies to the Groupon.com business model. In that process, a groupon, or a localized or somehow otherwise personalized offer, discount, or coupon, is presented to a group of users—if enough users buy the groupons, then the deal kicks in and becomes active for all the purchasers. If not enough people buy the groupon, then no one gets the deal. When the deal is active, the user prints out the coupon or shows the coupon on an iPhone or other mobile device. In some cases, groupon.com provides a mobile device such as an iPhone to the merchant to scan the credit/debit card or the printed coupon in addition to using the card to make the purchase. A Google Wallet transfer can take place as well. This extra step is problematic and prone to employee error as well as requiring extra time and equipment. The problem with this approach is that the redemption of the coupon is more painful than necessary. The improved approach is to establish a policy for the activated groupon. FIG. 7 illustrates an example method embodiment for an improvement to the groupon business model. Each person who has purchased the activated groupon has their payment account associated with the groupon (702). If a user purchases a groupon, the payment account used to purchase the groupon can automatically be associated with the policy. Alternatively, a user can purchase a groupon as a gift for a friend or family member. In that case, the user's payment account is not supposed to be associated with the groupon. The system can send a notification to the friend or family member prompting them to register and/or otherwise associate their payment account(s) with the policy. In another variation, a user can purchase a groupon which is associated with their payment account, and at a later time, the user can transfer that purchased groupon to another payment account of their own or of another user. Thus, the user can purchase 5 of the currently offered groupon, keep 3 of the 5, and transfer the other 2 to a couple of her friends.

Then, as each purchaser goes shopping and makes the purchase at the participating merchant, the system detects each purchase (or other non-purchase event) and implements the appropriate discount according to the policy (704). For example, if the groupon was purchased for $40 for an $80 massage, and groupon was to get $20 and the merchant was to get the other $20, the person who bought the groupon would simply make the purchase like any other customer. The person can be charged the normal price of $80 at the point of sale. However, when the purchase is detected by the system as being performed by one of the groupon members, the appropriate money will be transferred to the various accounts. Therefore, assume the user purchased the massage using a credit card. When the credit card is processed, $80 is withdrawn from the user's payment account and transferred to the merchant account. The system then makes redemption transfers based on the policy. The user's account then gets a $40 credit to their account from the merchant account because the user purchased the $80 service for $40. $20 gets transferred from the merchant to groupon as their portion of the deal. To handle the various transfers, the system may include a holding account or can transfer money from the merchant account and the groupon account. For example, if the $80 is charged to the user account and transferred to the merchant account, then $60 would be withdrawn from the merchant account, $40 of which would be transferred back into the purchaser's account and $20 would be transferred to the groupon account. Fees and other costs could be withdrawn as well according to the business policy. The transfers of money can occur before, during, or after the purchase. A modern, network-connected point of sale system can process all this in substantially real-time and reflect the net result almost immediately.

The improvement to the processing of a groupon is that the transfer of the various portions of money is all done in the network, with the result that the ultimate experience of the end user is as simple as it possibly can be. The user just makes the purchase in the same manner as they normally would using their credit card, debit card, or regular payment account such as through a handheld or mobile device. Of course, this approach could work for any online or point of sale merchant.

Processing promotions according to a policy can also provide the merchant and groupon an opportunity to have a further communication with the purchaser, and to cultivate a relationship with the purchaser to convert the purchaser from a one-time groupon user to a steady customer. One way to promote a longer-term relationship is to offer a policy-based groupon-style offer, but only to customers who have already participated in and redeemed the first groupon offer. The system, after the purchase is processed, can notify the user that the money transfer and satisfaction of the policy is complete. A message could say "Groupon and Bob's Massage Parlour have fulfilled the Groupon Policy for the Groupon you bought—your Visa Account has been credited with $60 for the $80 purchase today." The message can be sent via email, text messaging, multimedia message, or via a notification on a smartphone.

FIG. 8 illustrates another method embodiment related to group coupons. The method of this approach includes the system receiving data identifying a group of purchasers of a group coupon (802). Each user has purchased a coupon, in which the activation of the coupon is dependent on a certain number of users buying the coupon. The group coupon is defined as the type in which an offer was presented to a number of recipients, and a predetermined number of people purchased the coupon, then the offer becomes live such that the purchasers can redeem the coupon of the group. A policy is established for the group coupon such that each purchaser can redeem the coupon by using a credit card, debit card or other payment account that can be electronically monitored (804). The system, for each individual purchaser, monitors his or her purchases (or other non-purchasing event) using the respective payment account (806). When each user makes the purchase at a merchant associated with the group coupon, or when a policy triggering event occurs, then the system applies the policy for that user (808). At some time during the financial transaction, the system charges the user's purchase account for the purchase and then distributes money to the various necessary accounts according to the policy (810). Such transfers can include a first transfer back to the purchaser's account from the merchant account or a holding account and a second transfer of money from the merchant account or holding account to the administrator of the group coupon. Various fees can also be charged at various stages. Variations include not charging the full amount at the time of sale by detecting that the purchaser's account is associated with the groupon.

Upgrading offers, modifying offers, and so forth can also occur according to this approach. For example, having an electronic policy can provide a gradual group coupon. For example, assume the group coupon becomes active with 1000 purchasers such that each user can buy a $30 dinner for $20. If one of the purchasers buys the meal shortly after the $1000^{th}$ coupon purchaser, then the savings would be $10. However, the policy may provide that if 10,000 purchasers buy the coupon, then the deal is that each user saves $15. If by the end of the day, 10,000 purchasers exist, then the user who purchased the meal earlier in the day can, when the system applies the policy, it can give the user the $15 rebate rather than the $10 deal. In this manner, even if the user has made the purchase early in the day, that user would still have an incentive to share the group coupon with their friends and family via their social network. Thus, the policy can be dynamic and flexible throughout the timing of the group coupon such that the ultimate fulfillment of the policy can occur after a closing time for the group coupon.

Another problem with the standard groupon approach with respect to flexibility is that under that approach, users commit to buy the groupon, for a fixed amount. Then they print the groupon or use their mobile device to show the groupon at the point of sale. The deal offered is fixed under that approach. Where a policy can be open and finalized based on more data throughout a variable time frame can provide additional flexibility for both purchasers and merchants. In one example, the policy can be associated with a pyramid approach. Assume a person buys the group coupon for a $30 valued dinner for $20. But, if by sharing that group coupon with friends through their social network (via email, Facebook, etc.), they are able to get 20 other people to also buy the group coupon, then their coupon increases in amount such that they can get the meal for $10. By remaining flexible in the ultimate amount that the coupon is worth to the first buyer, the system can handle the ultimate money transaction with all the data, even after the transaction has already occurred. For example, if the first purchaser buys a meal at the merchant associated with the coupon when only 2 of their friends have also purchased the coupon, the system does not have to process the transaction until later that day or the next day, depending on how long the availability exists for friends to also buy the coupon. If ultimately, only 15 friends buy the coupon, and then when the policy is applied, the first purchaser may get a refund of $13 for the meal.

The approach disclosed herein also enables more complex groupons such as a "dinner and a movie" groupon in which related businesses can offer two-part deals. If a purchaser buys dinner a restaurant and then two movie tickets, then the policy will monitor for both purchases and then apply the police to redeem the groupon. Further, the groupon could be tied to a region or group of stores such as a mall. Given the flexibility of the policy, the groupon can be for all users who plan on spending more than $100 at the mall, and can enable them to get a 30% discount. Then, when the right number of groupon purchasers activates the groupon, users only need to go to the mall and make various purchases. When they total $100, then the policy would apply to that user and the discount can be applied to the purchases. Further, a groupon can be triggered not only by a buyer, but also based on social networking hits. This approach can enable the merchant to initiate and cultivate a more close relationship with customers, in an attempt to convert customers from a one-time customer to a recurring, steady customer.

Such groupon-style promotions can be tied to other interactions to enhance the promotions. For example, users can buy a groupon for 5% off dinner at a restaurant. However, if two users use the groupon at the same time, within 1 hour of each other, or on the same day, for example, the temporal proximity of the two uses of the groupon can 'stack', so that each receives 10% off instead of 5% off, up to some optional maximum amount. The policy can detect that mobile devices of the users are at the restaurant at the same time, or can detect that the users are at the restaurant at the same time based on the groupon transactions. In this scenario, the system identifies a 'stackable' groupon, then identifies a first user and a second user who are each conducting respective transactions using the stackable groupon within a threshold time of each other. Based on the respective transactions, the system enhances a promotion associated with the stackable groupon for the first user and the second user.

Such stacking can encourage social networking for friends or other associated groups of people to utilize their coupons at the same time. Groups can each bring in their coupon and automatically have then enhanced by virtue of others adding to the "stack."

Merchant Portal

FIG. 9 illustrates another embodiment of this disclosure that relates to a merchant portal for enabling a merchant to manage and enhance the purchasing experience at their store when a policy applies to any purchaser's activity. Every merchant in this system can have their own portal 900 to manage how offers are processed to at least some degree. For example, Joe's Pizza may be a single shop owned by Joe in Dunkirk, Md. The system can provide a portal in which Joe can go in and affect the policies that are established when a giver gives a gift card to a recipient. For example, Joe may want to reward the giver for choosing his store as a merchant. One such exemplary scenario for providing rewards is to map certain user behaviors to earning extra points in a loyalty or rewards system that are redeemable for discounts on gas, grocery, or other purchases. Joe can go in and for a period of time, or indefinitely, establish an offer for givers of a 10% reward of any gift card amount given 902. So if the giver selects Joe's for a $50 gift card for a recipient, one policy is established to monitor the recipient's purchases. Another policy can automatically be established to monitor the giver's purchases such that when the giver goes to Joe's to eat, the giver gets a gift card of $5 904. Thus a second policy is established or triggered in which the merchant is the giver and the original giver is the recipient. After the giver purchases something at Joe's, and the transaction is processed, $5 will be transferred from Joe's payment account to the giver's payment account in the same fashion as disclosed herein.

Joe's could also enhance the original recipient's gift card by adding a percentage to it or adding a free dessert, or any other kind of modification to the original gift card. All of the regifting and monitoring principles apply here too. For example, if Joe offers the original giver 10% on his or her own gift card, the original giver can regift that and add it to the original gift card for the original recipient, thus generating a $55 gift card for the original recipient.

The merchant portal can also enable the merchant to provide advertisements when their name is selected by a giver such that the giver is incentivized to select them for the gift card 906. Fees can be charged to the Merchant for placement in a particular position in the listing of merchants, size of the name, and presentation. The merchant can upload or link to a YouTube video. The merchant portal enables merchants to interact at a very unique circumstance on the network, which is when a giver has chosen them to give a gift to someone else. The system will provide any number of mechanisms for merchants to interact with the givers to enhance their experience in selecting the merchant for the gift card. The merchant may simply want a "thank you!" message, or a multimedia message presented to the giver 908. Offers, such as encouraging the giver to limit the time frame of the gift card to a certain weekday, can be presented. The merchant may always have slow Wednesdays. The giver or recipient can receive an extra amount on a gift card if the original gift card is limited to Wednesdays.

The merchant portal can allow the merchant to tailor offers to specific categories of customers. For example, the merchant portal can tie in to customer loyalty data to determine which users are frequent customers that do not need incentivizing to return to Joe's Pizza, and can refrain from offering significant (and probably unnecessary) discounts to those customers, or can conversely offer 'loyalty' discounts to those users. Further, the merchant portal can present customer analytics data to the merchant, showing which customers are trending down in visits to Joe's Pizza or are trending down in overall money spent, for example. Then, Joe can offer additional incentives to nurture these customers back to frequent patronage, or can reach out to them with targeted individualized offers having a custom message like "Hey Mark, we missed you last Wednesday at lunch. Here's a coupon for $3 off next Wednesday between 11:30 am and 2:00 pm." The merchant portal can provide merchants with the ability to target specific customers with promotions or to target categories of customers.

The merchant portal can also enable a merchant to manage their coupons for purchasers of coupon books. For example, the merchant can determine how many coupons are left to be redeemed and receive business intelligence about the individuals who still have not come to the store. The merchant could add incentives like an offering of an additional 10% discount if the High School team wins the football game. Then the merchant, if the team wins the game, could click on a field in the merchant portal to apply that additional discount to all the coupon holders. Thus, the merchant portal can apply both to gift cards and to the coupon books disclosed herein.

Thus, the merchant portal enables a merchant to essentially effect and enhance any aspect of a policy associated with purchases at their store. For example, not only can they add gift card options to the gift card or other promotional offers to the giver and/or the recipient, merchants could even create their own groupon using this approach, targeted to specific subsets of customers or to all customers. For example, a merchant may decide that if 20 users each give at least a $30 gift card to their store, that each of the givers and/or recipients will receive a promotional offer such as an additional $3 on the gift card or a $3 gift card to the giver and so forth. The policy also does not have to be related to purchasing transactions. For example, the owner of a pizza parlor near a stadium may give an extra bonus to everybody that has gift cards if the Washington Redskins win their game on a certain night and those having gift cards come in. Any type of triggering event that could be entered into the system could be effected by the merchant portal. Holidays, individual birthdays of users, manually entered data, and so forth can trigger changes in the policy for one or more of the people involved in a gift card.

A service could be associated with the merchant portal in which general business intelligence is provided, such as a likely demographic, such as ages 20-30, who will use their coupons on a Friday night. With that data, the merchant could couple such information with a promotional offering to a subgroup of those current coupon holders for that merchant. To therefore provide a targeted promotional offering, the system could charge the merchant a small fee, or not, to enable the merchant to send out promotional offerings to those holding coupons (or gift cards) for that merchant that are ages 20-30, for use on a Friday night, for an additional discount or other promotion. In this manner, an enhanced level of business analytics and intelligence aid to encourage the right demographic to use their coupons or gift cards at a likely time when they would anyway. Such a promotion can also be used to encourage their off-times usage to increase business at times when the demographic is not likely to patronize the merchant.

Indeed, yet another additional feature given this approach is the ability of merchants to provide their own offers even independent of a giver selecting the merchant as part of a gift card to a recipient. For example, given that individual user's payment account information is already stored in the systems database, the owner of a pizza parlor may simply go to their portal and create their own policy such as providing or generating their own group coupon. In this case, they could simply enter data that if 100 people registered with the system come to dinner on a particular night, each person will receive a 10% off rebate. Alternatively, if 100 people registered with the system order Lobster for dinner, each person ordering Lobster that evening will receive a 25% discount off that dish. In that case, users of the system may receive emails or some type of notification of this group discount and, without needing to pre-purchase the offer, and with or without any need to accept or respond to the communication, the users may simply go and have dinner, they may or not know then whether they will receive the discount. However, if throughout the night, 100 of the users do go to dinner, then the policy can kick in and each of those 100 people can receive a 10% discount. In this regard, this can provide an improvement over the groupon concept because users do not have to pre-purchase the groupon prior to it becoming effective. It is a more dynamic approach where users may simply choose to go to that restaurant with the chance of the policy being fulfilled based on their purchase as well as other people's purchase such that they may receive the benefit of the group discount.

Accordingly, the merchant portal provides numerous mechanisms of merchants being able to implement or effect policies associated with gift cards, group purchases, or any kind of purchase at their establishment that can be effected by a trigger or any type of event. One benefit of this approach is that it does not require any complicated or staffing matter inasmuch as the merchant portal can provide all of the various options for triggering discounts to users who have their payment account information registered. The actual process of handling a transaction at the point of sale does not change, so no additional employee training or equipment is needed.

If the payment account is provided through a mobile device such as via Google wallet, then further information can be provided to the user given their location or data that they are about to use their Google wallet to make a purchase. For example, if a merchant has a 10% discount if 100 registered users of the system go to dinner that night, then if one of the users that has not yet gone to dinner that night happens to drive near the restaurant, an advertisement can be sent that says only 15 more registered users need to eat at the pizza parlor for the discount to apply. This may encourage one of the users to go to the restaurant and eat in the hopes that 14 others will also follow to trigger the group coupon according to the policy. If a user is using a mobile device to make a purchase at the restaurant and suppose that they are the 100th registered user to make a purchase, perhaps the policy could be to provide them with an extra discount because it is their purchase that has caused the group coupon to be implemented. This can be a form of a contest or game to determine which customer will 'win' the extra discount, which can be a complete discount, i.e. free dinner. While the example herein is 100 users to purchase at the restaurant, the promotion can be much smaller or larger, and can span a short, long, or indefinite amount of time. Thus, their mobile device may receive an extra notice or music or some other multimedia presentation that identifies them as the one who caused the group discount to be implemented for the previous 99 consumers that day.

As can be appreciated, the flexibility that is provided by such a merchant portal is wide ranging and can be any combination of purchasing and/or non-purchasing related events. Personal profile data can also be used when implementing these policies. Again, if it is a particular purchaser's birthday, that data can be implemented into the policy and can be a triggering event to add a free desert or some other offering for coming to the store on that day. In this regard, the merchant portal may enable the merchant to simply say that anybody that comes in on their birthday receives a $3 discount. Therefore, such a policy can easily be implemented by the disclosed system herein because such personal information can be obtained and as each registered user makes purchases at the store, the policy can be checked to see if it is their birthday, and if so, multimedia communication can occur if the purchase is on a mobile device, or some other mechanism can be provided for the merchant to be able to communicate birthday wishes to the user and enhance the relationship of that particular user with the merchant. The policy can also be flexible enough to provide that if the purchase is within one week of the user's birthday that it can also be implemented in that case even on a grading scale. For example, the farther away from their birthday, the less the discount is.

Because the system knows both the giver data and the recipient data when a transaction of generating a gift card is performed, the merchant portal enables a social-networking type of ability to engage with people in a way not previously provided. The social network in this case involves the giver, merchant and recipient. Any communication (email, SMS, telephone call, multimedia presentation) can be triggered from one or more of the people in this small social network associated with a gift card. Facebook pages can be created, Skype video conference calls can be scheduled and held. For example, the system may be able to receive the data that the giver is giving the gift card to the recipient for a $25^{th}$ wedding anniversary gift. The merchant, owner, or manager of the store may wish to congratulate the couple including the giver. A Skype three-way video conference call could be automatically scheduled and everyone could then talk about the event before or after 910. For example, a video conference or other communication can occur between the giver and the merchant, wherein the giver explains to the merchant specific details, requests, and/or suggestions to enhance the wedding anniversary gift. The merchant can then have an opportunity to develop a relationship with the people by personally thanking them for coming and asking if they had a great time. Thus, the portal in which the giver is selecting the merchant and the recipient can present offers for other social networking type of communications with the merchant and/or recipient. This provides a simple opportunity, without much work or cost on the part of the merchant, to greatly enhance the customer experience. The system can automatically flag, for the merchant, customers which are likely to respond positively to such personalized attention, and which are likely to be profitable or loyal customers. Because the merchant knows in advance that a particular type of merchandise or service is to be provided, the merchant can prepare in advance and suggest relevant accessories, add-ons, or enhancements to the gift. For example, if the wedding anniversary gift is a specifically styled ring, the merchant can arrange to offer a discount on a matching tennis bracelet or other accessory. The merchant portal can provide insight into the preferences and predilections of the customers in advance to help the merchant determine what types of 'upgrades' to offer and at what discounts, if any. A specific video presentation can be transmitted to an iPhone to welcome the user as they arrive at the store.

Merchants can also create unique policies. They may want to give an incentive just for having someone come into their store. The policy can be location based or activity based and not simply purchase based 912. For example, a real-estate agency or a merchant selling time-shares in Florida may want to reward users who simply come and peruse real-estate listings or listen to a time-share presentation.

In yet another aspect, the group coupon can be offered dynamically. For example, the merchant may be able to set out various parameters on how much the discount should be. The simple example above is that if 100 users come in and purchase dinner tonight, then each one receives a 10% discount. However, a variable component of this might be where each of the first 90 purchasers receives a 10% discount but a gradual scale will occur for the last 10 such that the $100^{th}$ purchaser receives their meal free. In a contest or promotion such as this, the order of customers becomes important. Thus, the system can determine ordering of the 100 purchasers based on arrival time, ordering time, and/or the time of the transaction. Notices can be provided to the users if desired to tell them where they might fall in the variable coupon offerings. Thus, the $91^{st}$ purchaser might receive a 15% discount, the next purchaser may receive a 20% discount and so on. In addition, the policy may be fluid to the extent such that the system can monitor the restaurants or stores overall performance that night. Thus, if the restaurant already has a lot of business that night then the offering may be reduced since additional business is not necessarily needed. Thus, the particular offering and the discount provided for purchasers can be more tied to real time business needs and activities. These promotions can roll over, such that every $100^{th}$ purchase on a Friday night is free, for example.

This provides another distinguishing feature from the groupon approach inasmuch as groupon typically provides one offering for an entire community per day. The approach disclosed herein can provide a single merchant based offering in which individual merchants can have simultaneous offerings in the community. The system can referee between various offerings such that users are not inundated. However, the merchant portal approach herein enables individual merchants to easily tailor their own offerings that can further be specifically tied to their actual business performance at any given moment.

The merchant portal principles set forth herein can be applied to gift, coupons, and/or coupon books. A unified merchant portal can allow merchants to manage all policy-based promotions, gifts, and offers in a single destination. The exact functionality and options provided to the merchant for managing gifts, groupons, coupon books, etc. may vary. The same merchant portal can provide insight into customer analytics, purchasing patterns, and advertising campaigns associated with the policy-based transactions. Thus, a merchant could receive analytical data indicating that it is likely that the demographic of ages 20-30 who have coupons will likely spend them on a saturday afternoon and evening. The merchant could then provide offerings to that demographic such that the use of those coupons by that demographic will include an additional 5% discount. Thus, the merchant offerings can be tailored to a particular subgroup of all owners of a coupon in the system.

User Interface

FIG. 10 illustrates another example of user interface for givers to interact with for purchasing gift cards for recipients. The policy can be put in place to apply discounts, coupons, promotions, and/or other purchaser or giver benefits according to tags or categories of merchants. For example, a user can search in a browser 1000 for merchants by product category, such as 'consumer electronics' which may include merchants that specialize in consumer electronics such as Best Buy and RadioShack as well as other merchants that carry a limited selection of consumer electronics such as Target or Home Depot 1002. The system can access a database of merchants, nationwide and local, as well as corresponding merchant tags for specific product categories, target demographics, price range, and so forth. A merchant can be assigned multiple tags. The user can search merchants by tag, but select a specific subset of merchants for which the policy is active.

The system identifies a group of merchants that satisfy the category, then generates a policy for when the recipient makes a purchase at any one of that group of merchants. Merchants can tag their store with tags identifying part of the category 914. For example, a merchant can log in to an interface 900 or otherwise update the database to reflect changes or additions to their product line-up 916. Further, users can add, remove, and update tags assigned to merchants. The tags can vary over time.

In addition to searching by tag or by specific merchant, users can search by region 1004. A user can search for merchants by category or tag in a local region or nationwide. For example, the user can search for and select a gift for any pizza place in downtown Salt Lake City, or can select a gift to any Godfathers Pizza nationwide. In this manner, users can tailor a search in any geographical area such as nationwide, regional, local or even in a neighborhood. The ability for merchants to be able to tag data about their store can enable users to have a localized search but is otherwise not possible. In addition to merchant-generated tags, users can generate and assign tags to specific stores. For example, a user can tag a restaurant as "fast service" or "friendly waitstaff". Then other users can search for merchants by user-entered tags to ensure that the policy associated with a gift will be applied to stores having at least a simple majority of 'positive' tags or some other criteria.

The system can provide an interface for merchants 900 to intercept and 'hijack' gifts or promotions intended for competitors. For example, if a user has a policy in place offering $5 off a purchase of $20 or more at Domino's Pizza, Godfathers Pizza can offer the user an improved offer to entice the user away from Domino's, such as $8 off a purchase of $20 or more. Godfathers Pizza can indicate which types of users or which user characteristics are worth how much. For example, Godfathers may consider a consumer that eats pizza twice a week as more valuable, and can offer that type of user a steeper discount in order to tempt him to try switching from a competitor. In a particularly intense rivalry, a merchant can offer a policy that offers to intercept competitor's promotion or coupon policies and offer to customers promotions that provide a larger discount, for example. In one aspect, 'hijacking' gifts or promotions is an option that is allowed or disallowed by the giver and/or by the recipient of a gift. For example, a giver may want the recipient to go to a particular store, and so may disallow 'hijacking'. In another example, the recipient of the gift is a starving college student who wants to maximize the return or value for money spent and is not loyal to any particular merchant. This recipient can subscribe to competitors offers to 'hijack' the gift to shop around and see which merchant will offer the steepest discount.

The system can provide an analytics portal 918 for merchants to view acceptance rate for coupons or promotions associated with a policy, as well as follow through rates of using the coupons or promotions according to the policy. The analytics portal can provide detailed insights into virtually every aspect of customer purchases, types of policies in force, trends in purchases and redemption of policies, advertising, customer preferences, currently ongoing promotion campaigns, and so forth. Merchants can compare their analytics data to anonymized aggregated data from other merchants in similar industries, or even direct competitors.

In the analytics portal 918, merchants can also manage specific giver and recipient offers for individual users, groups of users, and/or for all users. Merchants can manage and establish payments and guidelines for advertising to users. Merchants can also manage settings for sending automatic or manually triggered 'thank you' messages for users that have taken advantage of a policy. For instance, a store manager for a restaurant can receive a periodic notification of customers who have recently applied a policy to a purchase or other triggering event such as just being in a store. The system can generate automatic suggested 'thank you' messages for these customers, and the manager can customize the suggested messages for the specific customers. Merchants can include media such as video, audio, and images in their 'thank you' messages for branding or other purposes.

A merchant can manage the frequency of sending reminders to users having outstanding policies eligible for that merchant, and optional additional enhancements or promotions to those outstanding policies to encourage users to make purchases at the merchant that trigger the policy.

In one aspect, merchants can, through the merchant portal interface 900, pay for priority placement in search results 920. For example, a merchant can pay a premium to appear first in search results for all queries, for a particular query or keyword, for a particular demographic of searchers, for a particular region, at a particular time of day or time of year, and so forth.

FIG. 10 illustrates an example of a listing 1006 of search results. In this listing, Joe's electronics could have paid a premium to appear first for a search in the category of electronics in southern Maryland. The price for prime placement in search results can be based on the number of competitors bidding for placement, how much customers spend on average for the category in which the placement is desired, and so forth. Merchants can pay for placement for a specific duration, for a specific number of searches, or for a specific number of purchased gifts or promotions, for example.

The system can establish a persistent temporary social network involving the merchant before, during, and/or after the purchase. For example, the social network can enable communications, chat, comments, and other social interactions relating to the policy, the giver, the recipient, and/or the merchant. In one example, the merchant can enable a video chat at the point of purchase between the giver and the recipient, so that the three can participate in the moment of redeeming the gift enabled by the policy. Video chat on a mobile device can occur as well. Where the triggering event is location based, the system can enable these additional social networking capabilities.

The system can charge fees for providing each piece of these services available through the merchant portal as a package or on an a la carte basis.

Further, merchant portals 900 can be regionalized. For example, Olive Garden can have a corporate level portal for managing nationwide policies, promotions, and merchant settings, in addition to regional and/or individual store owner portals. Thus, if a user browses to give a gift to another user for a specific Olive Garden, then the system can provide promotions and specials from the national corporate level layered on top of the region and/or the individual store level. In this way, specific stores or regions can offer layers of national, regional, and/or local incentives to users to give gifts or purchase coupons or discounts for a specific store or set of stores over other stores in the chain.

Figure 11:
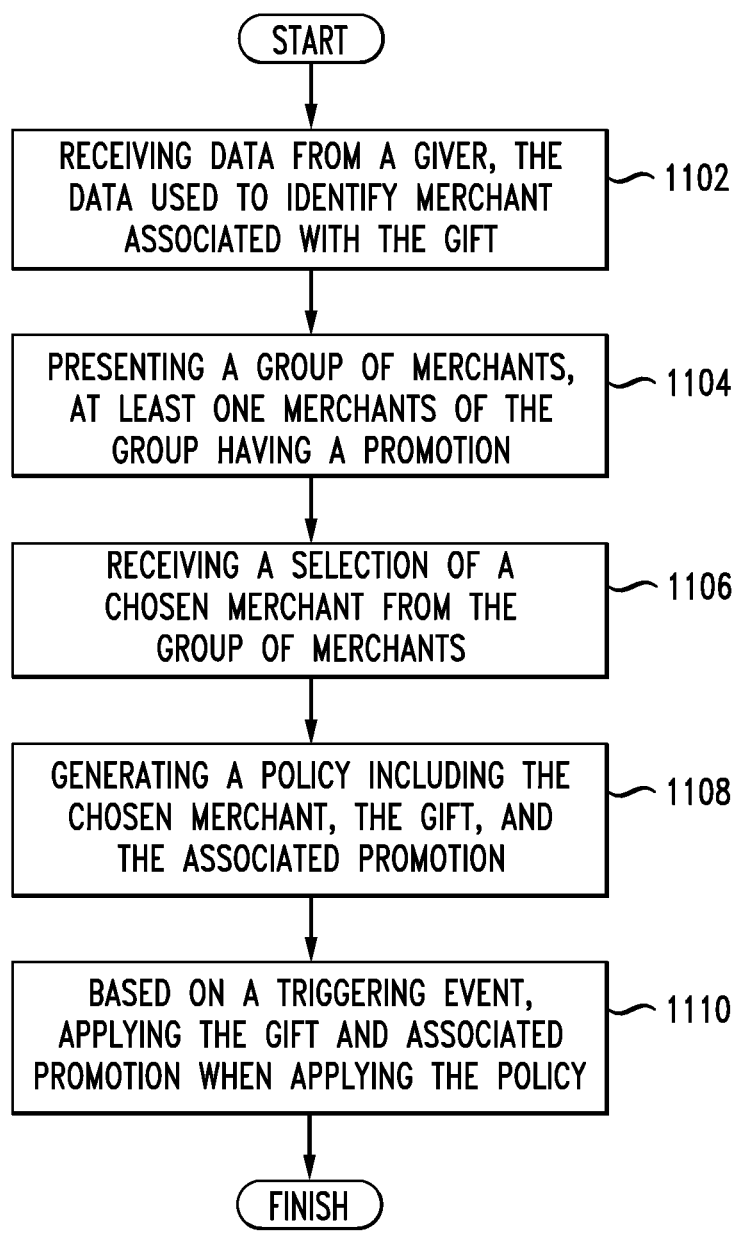
FIG. 11 illustrates another method embodiment.

FIG. 11 illustrates an example method embodiment for enabling merchants to provide promotions. The method includes receiving data from giver at a first-time, the data being used to identify a merchant at which a gift from the giver to recipient is redeemable (1102). The system presents a group of merchants associated with the data to the giver and each merchant of the group of merchants offers a promotion in connection with the gift (1104). The system receives from the giver a selection of a chosen merchant from the group of merchants with the chosen merchants having an associated promotion (1106). The system generates a policy including the gift, the chosen merchant and the associated promotion (1108). The policy in this case not only includes the standard gift amount, the chosen merchant data about the recipient, but it also includes the associated promotion. Upon receiving an indication of a triggering event caused by the recipient, the system applies the gift and the associated promotion to the purchase according to the policy (1110). In one aspect, the gift has an associated amount of money that is drawn from a giver payment account. The giver payment account can be independent of the recipient payment account. Further, the giver account and the recipient account both exist prior to the first time. Thus, two friends, each with existing payment accounts of some type, can participate in this process using those existing payment accounts.

One example of a triggering event is that the recipient made a purchase at the chosen merchant using a recipient payment account. When the system presents the group of merchants, it can pre-sort to group by at least one of location, price, promotional offerings and similarity to the data. The group of merchants can include a competitor to a particular merchant. The placement of one merchant in the group of merchants can be determined based in part on a payment from the at least one merchant. In another aspect, the chosen merchant includes a category of merchants and in another aspect the category merchants can share common characteristics. Examples of common characteristics include at least one of the price range, a product or product category, a specific product, a location, a franchise, and the manual selection by the giver. The triggering events can be purchases made by a recipient account using a debit or credit card, a Google wallet, and a location of mobile devices. Other trigger events can be location-based or non-purchasing events such as news information, political information, weather data, sports data and so forth. Any source of external data can be utilized as a triggering event. The policy can be broad enough and flexible enough to encompass any triggering event.

Merchant Promotions for Interactions

FIG. 12 illustrates yet another method embodiment. Assume that Mary has a gift card purchased for $50 at Olive Garden, and thus a policy exists which is monitoring a triggering event such as her being at an Olive Garden restaurant, or making a purchase using her existing payment account at the Olive Garden. One triggering event (1200), such as an identification that Mary is at the Olive Garden through a location-based service which tracks her iPhone, independent of any purchase, can cause the system to engage in a dialog with the user (1202). Questions can be transmitted to her iPhone. These can be of any type and could include suggestions for purchasing lunch or dinner. An additional offering can be provided if they answer the questions. For example, the system and/or the merchant could offer an additional $5 to the giftcard if they answer three questions. Any type of interaction is contemplated here. Perhaps if the user views a short video, then the boost to the gift is offered. The recipient Mary of the gift, could be asked if they want to receive additional promotions when they are at the merchant location (the merchant associated with the gift card). The recipient could also opt in to receive notifications if they are at a competitor's location or at any location. The system could ask for additional information to enable this interaction. For example, the system can ask for the user's telephone number or other identifying data if necessary such that when their location triggers the process, the system can text, or call, or utilize that identification data to ask the questions or present the interaction. Then, if the recipient engages in the required interaction, then the system will add the promotion to their existing gift for that merchant (1204).

Thus, in one example, assume that Mary gets a gift card from John for the Olive Garden and included in that gift is an invitation to potentially receive additional promotions when she is at the restaurant. She then goes to the restaurant with her mobile device. The system detects that she is at the right location and engages in an interaction such as asking questions, running a brief promotional ad for their specials that night, or otherwise presents an interaction with her. It can even be an interaction on a device at a restaurant table or other device at the restaurant besides Mary's mobile device. Such a merchant device can be any device at the merchant which can present an interaction to the user. The recipient device is typically a mobile device carried by the gift recipient that can also be used to present interactions. The recipient could even order their meal on their mobile device or a device at the table or elsewhere. Mary fulfills the requirement of the interaction and thus the system presents her with a promotion such as a free desert, an extra $3 on her gift for the purchase, and so forth. The interactions can be inter-personal interactions with a waiter, for example, which the waiter enters into a point of sale device or other merchant device on behalf of the customer. In another variation, the interactions are interactions on a paper receipt, such as survey questions or other questions, which the user fills out with pen and paper, and which are reported or recorded by the merchant.

Then, assume that Mary's meal is $55. When Mary purchases the meal using her existing payment account, then the system not only processes the $50 gift card from John, but also one or more promotions from the system and/or the merchant (1206). If it is an additional $3 promotion, then $3 would be transferred from a merchant account to Mary's payment account. Any type of promotion is contemplated. Implementing the promotion can involve modifying the policy over the gift for the Olive Garden to add money from another account, or in any other fashion modify that policy to implement the promotion. It can also include a hybrid of money offerings, later coupons, free deserts or a free second meal, and so forth. A system separate from the merchant can offer this service and then charge a merchant a fee for the service. The promotion can be a $10 discount from their next meal at the Olive Garden. In this case, the policy that governs Mary's gift for the Olive Garden can simply be modified such that $10 is added to her gift for purchases at the Olive Garden. These provide an incentive and an opportunity for merchants to engage in a personal interaction with their customers while at the store using their mobile devices or a merchant device and can greatly enhance the customer experience and loyalty.

The promotions and associated required interactions can be targeted to all users, specific users, or randomly selected users. For example, the merchant can indicate that every $1,000^{th}$ customer should receive a 50% discount in exchange for providing feedback on the merchant experience as well as some level of demographic information. The merchant can target interactions at new customers, at users who are in a social graph of at least two other regular customers, at customers who spend at least a minimum amount of money or who have a minimum number of people in their party, and so forth. Further, the system can vary the type and quantity of the interactions requested from the user based on transaction information, a user profile, analytics goals, social networking data, and so forth.

The customer can provide all or part of the requested feedback as part of the interaction, and the completeness of the feedback can determine the extent of the promotion. For example, if the customer answers ⅔ of the questions associated with the interaction, the system can apply ⅔ of the promotion. The user could engage in answering questions or playing a game, such that their success in the game is tied proportionally to the amount of additional discount or benefit they receive. The user can play all or part of these games on a smartphone or other mobile device. The game can offer rewards that enhance a gift or a promotion associated with a coupon by simply modifying the policy. For example, each user can spin a wheel on a virtual screen, which is unlocked based on location (i.e. the mobile device indicating a location within or near to the merchant). When the wheel stops spinning at a particular 'slot' or region, that slot or region indicates a bonus, such as an extra $5 off, or free breadsticks, or $10 off your next visit. Then the system can modify the existing policy to implement the wheel spinning prize or can create a new policy. The games can span multiple users and mobile devices. For example, a merchant establishes a trivia test game for a particular day. All users with coupons (or all users with capable mobile devices) can take the trivia test on that particular day, either on their mobile device or on a merchant-provided device, such as a kiosk or other device at tables in a restaurant (which can be separate or integrated into a table, for example). At the end of the day, the user(s) with the highest score in the trivia test receive a discount or promotion either on their previous purchase, via a policy, or on a future purchase. This approach can be applied to any kind of single-player or multi-player game. This approach enhances the sense of community and camaraderie of customers, and makes the user experience at the merchant more 'sticky' so users have positive feelings, and a desire to return and patronize the merchant.

Tying in to Customer Loyalty Programs

Many merchants, such as grocery stores, offer loyalty or rewards programs. For example, a grocery store can offer a 5 cent discount per gallon on gas purchases to customers that spend at least $100 at the grocery store. Customers may earn points via making purchases at the grocery store which can then be redeemed for groceries or gas. The grocery store can have its own gas pump nearby or can partner with a separate gas station company to provide such benefits. In some cases, extra points are offered in the rewards program for specific purchases. For example, one grocery store offers a multiplier to reward points (such as 4× the normal amount) for purchases of physical gift cards for participating gift cards. For example, for every $10 gift card purchase at the store, the purchaser gets 40 points. For every $25 gift card purchase, the user gets 100 points and one 10 cent per gallon fuel reward. This arrangement provides one way for a merchant to make their establishment more attractive to consumers by allowing them to accomplish two tasks, i.e. grocery shopping and filling up with gas, in one destination.

A problem with the existing rewards program for buying gift cards is that one must go to the store and buy a physical gift card. This method requires the expense of printing and generating the separate gift cards that are just thrown away after they are used or they can be lost and thus the value not redeemed. One way to enhance the existing arrangement is to offer policy-based gift cards of the type disclosed herein to consumers while they are at the pump. Many grocery stores already offer traditional gift cards for sale, so the target audience is already familiar with gift cards and is susceptible to purchasing gift cards. One way to provide loyalty rewards or discounts at the gas pump is to track 'points' earned by purchases that a customer can use for discounts on gas or on future grocery purchases. The grocery stores can offer additional points for buying gift cards through the grocery store. The concept of policy-based gift cards can be applied to this scenario, with the grocery stores being 'resellers' of policy-based gift cards. While merchants can 'resell' physical gift cards, they do not need to purchase and stock inventory of policy-based gift cards and are thus not 'resellers' in the strictest sense.

In one example, a user purchases a policy-based gift card at a gas pump point of sale associated with a grocery store, and the gas pump point of sale can serve dual purpose of facilitating the purchase of gas as well as the purchase of the gift card. The user can enter their loyalty or rewards information as part of the transaction, such as by entering their phone number or by swiping or scanning a loyalty card. The user also pays with their credit card, debit card or pther mechanism. Therefore, the system can utilize the reward program data, with the giver's payment account data, in addition to receiving the gift card recipient data, to establish the policy for fulfilling the gift card and rewarding the giver via the rewards program. The gift card can be associated with purchases at one or more merchants, such as selected merchants that pay for inclusion. In exchange for the user purchasing the gift card, the system can adjust the price of the gas down in real time. For example, the grocery store and gas pump can run a promotion where for every $25 worth of gift cards purchased, the customer receives an additional 10-cent discount off the current gas purchase.

In one example, assume the user buys a $100 Home Depot gift card at the gas pump. At the pump, the user can interact with the point of sale display and inputs on the gas pump, or can interact with a mobile device such as a smart phone or tablet to see a list of participating merchants for gift cards. The system receives the payment account data of the purchaser, reward program data for a rebate on gas, and the recipient data. Upon making the purchase, the gas pump point of sale can automatically apply a discount to the price per gallon for gas. If the user makes the purchase in the grocery store, the system can automatically apply or deposit points in the user's loyalty rewards program account that are eligible for use at the gas pump or for other discounts or promotions. Since the gift cards as disclosed herein are not separate physical gift cards, a purchase in the grocery store can be accomplished via a grocery store display such as at the self checkout point of sale or at the manned checkout isle. A display can present an inquiry asking "do you want any virtual gift cards today?" The user may have already entered in their rewards number and swiped a card associated with their payment account. The user can then electronically pick a gift card for the Olive Garden, or Home Depot, and quickly identify the amount and the recipient as well. The display can be connected to a back end server that provides the ability to tailor the filtering and focusing of potential recipients. For example, when the user slides their card or enters their rewards data, the system can then know who the user is and have data that can narrow the likely recipients of gift cards. The user can then simply enter the basic data, pick a recipient, and commit to the gift card. The grocery store can then process the purchase and add the $50 gift card to the grocery purchase, plus any other fees, and add the enhancement to the rewards program accordingly. Thus, electronically, all of the goals of the purchase are met without the need for a physical gift card. Further, all of the benefits of the virtual gift card as set forth herein are met.

FIG. 13 illustrates a method embodiment according to the description above. At a point of sale device which includes a display that the purchaser can interact with, the system will receive information identifying the user (1300). This information can be a reward program number, a payment account information such as a credit card or debit card and PIN, a fingerprint, or any other identifying data. The system then knows the person and can provide a personalized interaction for purchasing a gift card through the display. The interactive display in one embodiment can be the purchaser's home computer or a mobile device and not a point of sale device. The system presents an offer to the purchaser to buy a gift card (1302). The display can say "John Doe, welcome to Safeway. Would you like to buy a gift card for your Mother's Birthday next week?" The system then receives data via the display associated with the gift card (1304). The user can provide the amount (say $50), the merchant (Olive Garden, Home Depot) and the recipient. Since the system knows the purchaser, the identification of the recipient can be accomplished through a narrowed search. For example, since the system knows the person at the point of sale, their personalized contact list can be presented. Predictive data such as friends and/or family in their social network that have birthdays or anniversaries in the next two months could be presented. The system will know of the user's purchasing history as well. The offer can say "John, do you want to buy an Olive Garden $50 gift card for your mother's birthday next week? Last year you bought her an Olive Garden Gift Card and her feedback said she loved it. Click here to accept, and you will also get 4× your rewards points for a gas purchase at the grocery store." The user will provide information in one several different ways to identify the recipient of the virtual gift card as part of the data. If a predetermined set of data for a gift card is provided as in the example above, the user can in one click accept the offer. For example, in one click, John could purchase a $50 gift card for the Olive Garden for his mother, and optionally also receive rewards on John's reward program. The display can also present other personal data such as a picture of his mother redeeming the previously given gift card or the message his mother gave as feedback for the card. The display could also tap into wish lists of friend or others in a social network, and receive data on other suggested gift cards which have additional offers or provide a variety when compared with previous purchases. Users could also get extra bonuses for buying the gift cards in bulk. The display can present an offer from a merchant to buy two gift cards for Bed Bath and Beyond as the holidays are approaching. Because of the bulk purchase, extra rewards or discounts are provided to the giver. A grandmother may have presented to her, on the display, to buy the same gift card for Toys R Us for each of her twelve grandchildren. This can be presented in a compact format such as "Joan, hrere is a picture of your grandchildren, would you like to buy a $20 Toys R Us gift card for each of them?" The grouping of recipients can be a list, a characterization ("your three best friends" or "your four children"), a picture of a group of people, or a suggested list of recipients. This can simplify and speed up the process of purchasing the virtual gift card at a merchant point of sale or on another computing device, such as a gas pump, an ATM, in your car at a stoplight, a smartphone, and so forth. Just as set forth above, it is assumed that the recipient has a payment account in the system such that they can redeem the gift card via a purchase or other triggering mechanism, independent of a physical gift instrument. The system then implements a benefit through the rewards program for the purchaser (1306) and establishes the policy for the virtual gift card in the normal fashion (1308).

The system will then have all of the necessary data to accomplish the following: (1) providing rewards to the purchaser for the purchase of the gift card at the particular marchant; (2) establishing a policy for the virtual gift card as disclosed herein; and (3) enabling the purchaser to receive additional discounts such as on gas or other purchases through the rewards program of the merchant. The point of sale with an interactive display can be at a gas station pump, check out station, self checkout station, in an isle of the grocery store, or in any location. If the purchase is at a gas pump, the need for a rewards number can be eliminated. Thus, the "reward" or the discount could simply apply to a current purchase of a separate item or service that is associated with the gift card. This approach can simplify the process where while the user has 3 minutes of time while pumping gas, the interactive display can present the options of buying gift cards for recipients. If the user purchases a gift card at that time, a discount will be provided for the gas being currently pumped. Thus, in any of the scenarios disclosed herein, the need for the rewards program can be optional. Indeed, the rewards program can be tied to the giver's credit card. For example, if the purchaser buys a gift card at the grocery store, without being a member of a rewards program for that grocery store, the system could provide a discount on gas if the giver purchases gas later using that same payment account. In this manner, a "policy" could be established for that credit card which monitors those purchases and when a gas purchase is made, the discount is provided. The benefit of this approach is that when the user buys gas they do not need to provide a telephone number or other identifying information for their rewards program. In this way, the system can engage users right at the pump to enable users to buy a policy-based gift card for another person or for themselves and get the discount instantaneously.

The user could even make purchases in this manner on their own computer or mobile device. In this scenario, the user may simply be at home and be able to make a purchase of a virtual gift card while also having an opportunity to enter in their grocery store club card data to receive reward points for an additional discount on gas or discount on further grocery purchases. This enables participating stores to provide increased incentives to encourage purchasers to come to their brick and mortar store when making on-line gift card purchases as disclosed herein.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data that cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of executable instructions or associated data structures represents examples of corresponding acts implementing the functions described in the steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or a combination thereof) through a communications network. In a distributed computing environment, program modules can reside in local and/or remote memory storage devices.

The various embodiments described above are provided by way of illustration only and should not be construed to limit the scope of the disclosure. For example, the principles herein are applicable to virtual gift cards associated with any type of payment mode, including cash, checks, credit cards, debit cards, loyalty cards, and so forth. The principles herein can be applied to any virtual gift card that can be redeemed by using a payment mechanism to make a purchase in the normal fashion without the recipient using a separate physical card or entering a code. Any function disclosed herein in connection with one embodiment can be blended or incorporated into another embodiment. Given generally that redemption of a virtual gift card is managed by a policy, any policy features discussed above can be blended to provide new policies, although such new policy is not specifically set forth in a single discussion of any embodiment. Those skilled in the art will readily recognize various modifications and changes that may be made to the principles described herein without following the example embodiments and applications illustrated and described herein, and without departing from the spirit and scope of the disclosure.

We claim:
1. A method comprising:
receiving, at a network-based service provider, data from a giver at a first time, the data being used to identify a merchant at which a gift from the giver to a recipient is redeemable, the giver having a giver payment account existing prior to the first time and the recipient having a recipient payment account existing prior to the first time;
transmitting, to a giver device, a group of merchants associated with the data, each merchant of the group of merchants offering a promotion in connection with the gift;
receiving from the giver a selection of a chosen merchant from the group of merchants, the chosen merchant having an associated promotion;

generating, via the network-based service provider, a policy comprising the gift, the chosen merchant, a gift credit, and the associated promotion, wherein the policy is at least in part giver-defined and wherein the policy is linked to the recipient payment account;

transmitting an electronic notice to a recipient device, the electronic notice indicating the policy, the gift, the gift credit, and that the policy is linked to the recipient payment account; and upon receiving an indication of a triggering event caused by use of the recipient payment account at a second time which is later than the first time and as defined by the policy, transferring an amount of money from the giver payment account to the recipient payment account according to the gift credit to pay for the gift.

2. The method of claim 1, further comprising:
initiating a transfer of the amount of money associated with the gift from a giver payment account to a holding account.

3. The method of claim 2, wherein upon the receiving of the indication, the method further comprises:
transferring at least part of the amount of money from the holding account to the recipient payment account.

4. The method of claim 1, wherein presenting the group of merchants further comprises sorting the group of merchants by at least one of location, price, promotion, and similarity to the data.

5. The method of claim 1, wherein the group of merchants comprises at least one competitor to the merchant.

6. The method of claim 1, wherein placement of one merchant in the group of merchants is determined based at least in part on payment from the one merchant.

7. The method of claim 1, wherein the chosen merchant comprises a category of merchants.

8. The method of claim 7, wherein the category of merchants share a common characteristic.

9. The method of claim 8, wherein the common characteristic comprises at least one of a price range, a product category, a specific product, a location, a franchise, and a manual selection by the giver.

10. The method of claim 1, wherein the triggering event comprises a purchase made at the chosen merchant using the recipient payment account.

11. A method comprising:
receiving, at a network-based service provider, an identification of a giver of a gift having an associated gift credit and a recipient of the gift at a first time, wherein the giver is associated with a giver payment account existing prior to the first time, and the recipient is associated with a recipient payment account existing prior to the first time;
associating a policy having a triggering event associated with the gift and an application of the gift credit to pay for the gift;
determining, via a processor, whether the triggering event occurs according to the policy, the triggering event being associated with the recipient and occurring at a second time, which is later than the first time;
if the triggering event occurs, transferring money from the giver payment account to the recipient payment account, according to the policy and the gift credit, to pay for the gift; and
if the triggering event does not occur, not applying money received from the giver payment account to the gift.

12. The method of claim 11, further comprising:
initiating, at the first time, a transfer of at least a portion of the money from the giver payment account to a holding account.

13. The method of claim 11, wherein the triggering event comprises a confirmation that a recipient device is at a location of a merchant according to the policy.

14. The method of claim 11, wherein applying the money comprises transferring at least a portion of the money to recipient payment amount.

15. The method of claim 11, wherein the triggering event comprises a confirmation that a recipient device has been to one or more locations according to the policy.

16. The method of claim 11, further comprising:
if the triggering event occurs, presenting an interactable object to the recipient through a device; and
if the triggering event does not occur, not presenting an interactable object to the recipient through the device.

17. The method of claim 16, wherein if the recipient interacts with the interactable object, then adding a promotion to the gift; and
wherein if the recipient does not interact with the interactable object, then not adding the promotion to the gift.

18. The method of claim 16, wherein the device is one a recipient device and a merchant device.

19. The method of claim 17, wherein the policy is modified according to whether the recipient interacts with the interactable object.

20. The method of claim 19, wherein modifying the policy comprises transmitting money to the recipient payment account and applying the promotion.

21. A method comprising:
receiving, at a network-based service provider, data from a giver regarding a giver payment account and a giver rewards program account;
receiving, from the giver, an identification, at a first time, of a gift having a gift credit amount, a merchant and a gift credit recipient having a recipient payment account that is independent of the giver payment account;
establishing a policy associated with monitoring a triggering event associated with use of the recipient payment account at the merchant; and
providing a benefit to the giver via the giver rewards program account based on the triggering event, wherein the benefit comprises transferring at least part of the gift credit amount from the giver payment account after the triggering event.

22. The method of claim 21, wherein the identification identifies a plurality of gifts each having a respective gift card amount, a respective merchant and a respective gift credit recipient, and wherein each respective gift credit recipient has a respective recipient payment account that is independent of the giver payment account and that existed prior to the first time, the method further comprising:
establishing a plurality of policies, wherein each policy of the plurality of policies is associated with monitoring a respective triggering event associated the respective recipient payment account at the respective merchant; and
providing a benefit to the giver via the giver rewards program account based on the respective triggering event.

* * * * *